US012756587B2

(12) United States Patent
Iniesta Gonzalez et al.

(10) Patent No.: US 12,756,587 B2
(45) Date of Patent: Oct. 6, 2026

(54) OBTAINING INFORMATION RELATING TO TETHERING EVENTS

(71) Applicant: Telefonaktiebolaget LM Ericsson (publ), Stockholm (SE)

(72) Inventors: Antonio Iniesta Gonzalez, Madrid (ES); Miguel Angel Muñoz De La Torre Alonso, Madrid (ES); Irene Martin Cabello, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 257 days.

(21) Appl. No.: 18/570,285

(22) PCT Filed: Sep. 22, 2021

(86) PCT No.: PCT/EP2021/076130
§ 371 (c)(1),
(2) Date: Dec. 14, 2023

(87) PCT Pub. No.: WO2023/274569
PCT Pub. Date: Jan. 5, 2023

(65) Prior Publication Data

US 2025/0132938 A1 Apr. 24, 2025

(30) Foreign Application Priority Data

Jun. 28, 2021 (EP) .................................... 21382566

(51) Int. Cl.
*H04L 12/14* (2024.01)
*H04M 15/00* (2006.01)

(52) U.S. Cl.
CPC .... *H04L 12/1407* (2013.01); *H04M 15/8027* (2013.01); *H04M 15/8228* (2013.01); *H04M 15/8271* (2013.01)

(58) Field of Classification Search
CPC .... H04L 12/1407; H04M 15/80-8292; H04M 15/8271; H04M 15/8228; H04M 15/8027
See application file for complete search history.

(56) References Cited

U.S. PATENT DOCUMENTS 11,659,545 B2 * 5/2023 Jimenez Cordon ..... H04L 67/14 370/328
2009/0279543 A1 * 11/2009 Strom .................. H04W 76/18 370/389

(Continued)

FOREIGN PATENT DOCUMENTS

EP 3641248 A1 4/2020
WO 2019238252 A1 12/2019

OTHER PUBLICATIONS

International Search Report and Written Opinion of the International Searching Authority, PCT/EP2021/076130, mailed May 16, 2022, 26 pages.

(Continued)

*Primary Examiner* — Raymond S Dean
(74) *Attorney, Agent, or Firm* — Sage Patent Group

(57) ABSTRACT

Embodiments described herein relate to methods and apparatuses for obtaining information relating to tethering events. A method performed at a first network function for obtaining information relating to tethering events includes receiving, from a second network function, a first request to report information either related to detected tethering events in a session or related to detected tethering events for one or more services in a session; detecting a first tethering event at a first device; and transmitting a first message to the second network function, the first message including tethering information related to the first tethering event.

19 Claims, 20 Drawing Sheets

(56) References Cited

U.S. PATENT DOCUMENTS

| | | | | |
|---|---|---|---|---|
| 2015/0222489 | A1* | 8/2015 | Perez Martinez | H04W 48/16 370/328 |
| 2017/0164386 | A1* | 6/2017 | Fu | H04L 47/6275 |
| 2020/0059829 | A1* | 2/2020 | Joseph | H04W 36/0011 |
| 2020/0336964 | A1* | 10/2020 | Kawasaki | H04W 76/16 |

OTHER PUBLICATIONS

ZTE, "Solution for Tethering Control," C4-210063, 3GPP TSG-CT WG4 Meeting #101-bis-e, E-Meeting, Jan. 25-29, 2021, 2 pages.

ZTE, "Key Issue of Tethering Control," C4-210155 (was C4-210062), 3GPP TSG-CT WG4 Meeting #101-bis-e, E-Meeting, Jan. 25-29, 2021, 2 pages.

3GPP TS 23.501 V16.7.0 (Dec. 2020); 3rd Generation Partnership Project; Technical Specification Group Services and System Aspects; System architecture for the 5G System (5GS); Stage 2 (Release 16), 450 pages.

3GPP TS 29.244 V16.6.0 (Dec. 2020); 3rd Generation Partnership Project; Technical Specification Group Core Network and Terminals; Interface between the Control Plane and the User Plane Nodes; Stage 3 (Release 16), 318 pages.

3GPP TS 29.512 V16.7.0 (Dec. 2020); 3rd Generation Partnership Project; Technical Specification Group Core Network and Terminals; 5G System; Session Management Policy Control Service; Stage 3 (Release 16), 202 pages.

3GPP TS 29.519 V16.760 (Dec. 2020); 3rd Generation Partnership Project; Technical Specification Group Core Network and Terminals; 5G System; Usage of the Unified Data Repository service for Policy Data, Application Data and Structural Data for Exposure; Stage 3 (Release 16), 167 pages.

* cited by examiner

OBTAINING INFORMATION RELATING TO TETHERING EVENTS

CROSS REFERENCE TO RELATED APPLICATIONS

This application is a 35 U.S.C. § 371 national stage application of PCT International Application No. PCT/EP2021/076130 filed on Sep. 22, 2021, which in turn claims foreign priority to European Patent Application No. 21382566.4, filed on Jun. 28, 2021, the disclosures and content of which are incorporated by reference herein in their entirety.

TECHNICAL FIELD

Embodiments described herein relate to methods and apparatuses for obtaining information relating to tethering events.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

FIG. 1 illustrates a 5G reference architecture as defined by 3GPP.

Some of the relevant architectural aspects for this disclosure are: the PCF (Policy Control Function), the SMF (Session Management Function), and the UPF (User Plane Function).

The Policy Control Function (PCF) supports a unified policy framework to govern the network behavior. Specifically, the PCF provides PCC (Policy and Charging Control) rules to the PCEF (Policy and Charging Enforcement Function), e.g. the SMF/UPF that enforces policy and charging decisions according to provisioned PCC rules.

The Session Management function (SMF) supports different functionalities, for example, the SMF may receive PCC rules from the PCF and may configure the UPF accordingly through the N4 reference point as follows:

The SMF may control the packet processing in the UPF by establishing, modifying or deleting PFCP Sessions and by provisioning (that is, adding, modifying or deleting) Packet Detection Rule (PDRs), Forwarding Action rule (FARs), Usage Reporting Rule (URRs), QoS Enforcement Rule (QERs) and/or Buffering Action Rules (BARs) per Packet Forwarding Control Protocol (PFCP) session, whereby a PFCP session may correspond to an individual Protocol Data Unit (PDU) session or a standalone PFCP session not tied to any PDU session. Each PDR contains Packet Detection Information (PDI) specifying the traffic filters or signatures against which incoming packets are matched.

Each PDR is associated to the following rules which provide the set of instructions to apply to packets matching the PDI: one FAR, which contains instructions related to the processing of the packets, specifically forward, duplicate, drop or buffer the packet with or without notifying the Control Plane (CP) function about the arrival of a Downlink (DL) packet; zero, one or more QERs, which contain instructions related to the Quality of Service (QoS) enforcement of the traffic; zero, one or more URRs, which contain instructions related to traffic measurement and reporting; and zero, one or more BARs, which contain the buffering rules to apply to the matching packets.

The User Plane function (UPF) supports handling of user plane traffic based on the rules received from the SMF, for example, packet inspection (through PDRs) and different enforcement actions, such as traffic steering, Quality of Service (QoS) enforcement, and charging and/or reporting (through FARs, QERs, URRs, BARs).

Tethering is the practice of using a mobile device as a hotspot to connect to the Internet on another device, such a laptop or another mobile phone. Many mobile operating system versions offer tethered internet access capabilities.

Mobile network operators are interested in the detection of tethering events, in order to then apply different policies (such as access control policies, charging and/or reporting policies, and QoS enforcement policies, for example), to tethering traffic. An operator may wish to apply different policies to tethering traffic for a number of reasons. For example, tethering traffic may consume a significant bandwidth that the mobile network infrastructure is not dimensioned for. Furthermore, tethering traffic may not be currently charged any extra for in the case of flat tariff subscriptions.

In an effort to control a user's tethering behavior, an operator may potentially require one of the following:

- the enablement and/or disablement of tethering for a PDU session over the N4 interface,
- a restriction or limitation of the amount of tethering, (for example, by limiting the number of tethered devices and/or limiting the UL/DL bitrate when tethering is detected),
- the provision of separate QoS control policies for the traffic intended for a master device and traffic intended for the one or more tethered devices, and
- a change to a rating for an application's tethered traffic, and
- a request that the tethering is detected and reported tethering.

Presently, 3GPP has not specified tethering control, and tethering control has instead been left up to proprietary implementations.

SUMMARY

According to some embodiments there is provided a method performed at a first network function for obtaining information relating to tethering events. The method comprises receiving, from a second network function, a first request to report information either related to detected tethering events in a session or related to detected tethering events for one or more services in a session; detecting a first tethering event at a first device; and transmitting a first message to the second network function, the first message comprising tethering information related to the first tethering event.

According to some embodiments there is provided a method performed at a third network function for obtaining information relating to tethering events. The method comprises obtaining first information for use in determining policies to be applied to traffic; determining, based on the first information, a first policy to be applied to either tethering traffic in a session or tethering traffic for one or more services in the session, wherein the first policy indicates that a second network function should report information relating either to detected tethering events in the session or to detected tethering events for the one or more services in the session; and transmitting to a second network function a first request to report information related either to detected tethering events in the session or to detected tethering events for the one or more services in the session.

According to some embodiments there is provided a method performed at a second network function for obtaining information relating to tethering events. The method comprises transmitting, to a first network function, a first request to report information related to either detected tethering events in a session or detected tethering events for one or more services in the session; and receiving a first message from the first network function, the first message comprising tethering information related to either a first tethering event in the session at a first device or a first tethering event for one of the one or more services in the session at a first device.

According to some embodiments there is provided a method performed in a fourth network function for providing first information for use in determining policies relating to tethering events. The method comprises: transmitting, to a third network function, policy information relating at least in part to tethering events, wherein the policy information comprises one or more of: an identification of one or more services to which a first part of the policy information applies; an indication as to whether tethering is allowed for the session or allowed for the one or more services; a maximum number of devices allowed to tether for the session or allowed to tether for the one or more services; a list of device types allowed to tether for the session or allowed to tether for the one or more services.

According to some embodiments there is provided a method performed at a third network function for obtaining information relating to tethering events. The method comprises obtaining first information for use in determining policies to be applied to traffic; determining, based on the first information, a first policy to be applied to traffic of a session; and transmitting, to a second network function, a rule comprising at least one tethering policy to be applied to tethering traffic, and at least one traffic policy to be applied to other non-tethering traffic, wherein the rule is determined based on the first policy.

According to some embodiments there is provided a method performed at a first network function for applying a rule to tethering traffic. The method comprises receiving, from a second network function, a request to create or update a session based on a rule, wherein the rule comprises at least one tethering policy to be applied to tethering traffic, and at least one traffic policy to be applied to other non-tethering traffic, wherein each of the at least one tethering policy to be applied to the tethering traffic comprises one of more of: an identification of one or more devices to which the tethering policy is to be applied; an indication that the tethering policy is to be applied to all tethered traffic; a list of device types either allowed to tether for the session or allowed to tether for the one or more services in the session; a condition relating to a number of tethered devices, wherein the tethering policy is to be applied when the condition is fulfilled.

According to some embodiments there is provided a method performed at a second network function for applying a rule to tethering traffic. The method comprises transmitting to a first network function a request to create or update a session based on a rule, wherein the rule comprises at least one tethering policy to be applied to tethering traffic, and at least one traffic policy to be applied to other non-tethering traffic, wherein each of the at least one tethering policy to be applied to the tethering traffic comprises one of more of: an identification of one or more devices to which the tethering policy is to be applied; an indication that the tethering policy is to be applied to all tethered traffic; a list of device types either allowed to tether for the session or allowed to tether for the one or more services in the session; a condition relating to a number of tethered devices, wherein the tethering policy is to be applied when the condition is fulfilled.

According to some embodiments there is provided a first network function for obtaining information relating to tethering events. The first network function comprises processing circuitry configured to: receive, from a second network function, a first request to report information either related to detected tethering events in a session or related to detected tethering events for one or more services in a session; detect a first tethering event at a first device; and transmit a first message to the second network function, the first message comprising tethering information related to the first tethering event.

According to some embodiments there is provided a third network function for obtaining information relating to tethering events. The third network function comprises processing circuitry configured to: obtain first information for use in determining policies to be applied to traffic; determine, based on the first information, a first policy to be applied to either tethering traffic in a session or tethering traffic for one or more services in the session, wherein the first policy indicates that a second network function should report information relating either to detected tethering events in the session or to detected tethering events for the one or more services in the session; and transmit to a second network function a first request to report information related either to detected tethering events in the session or to detected tethering events for the one or more services in the session.

According to some embodiments there is provided a second network function for obtaining information relating to tethering events. The second network function comprises processing circuitry configured to: transmit, to a first network function, a first request to report information related to either detected tethering events in a session or detected tethering events for one or more services in the session; and receive a first message from the first network function, the first message comprising tethering information related to either a first tethering event in the session at a first device or a first tethering event for one of the one or more services in the session at a first device.

According to some embodiments there is provided a fourth network function for providing first information for use in determining policies relating to tethering events. The fourth network function comprises processing circuitry configured to: transmit, to a third network function, policy information relating at least in part to tethering events, wherein the policy information comprises one or more of: an identification of one or more services to which a first part of the policy information applies; an indication as to whether tethering is allowed for the session or allowed for the one or more services; a maximum number of devices allowed to tether for the session or allowed to tether for the one or more services; a list of device types allowed to tether for the session or allowed to tether for the one or more services.

According to some embodiments there is provided a third network function for applying a rule to tethering traffic. The third network function comprises processing circuitry configured to obtain first information for use in determining policies to be applied to traffic; determine, based on the first information, a first policy to be applied to traffic of a session; and transmit, to a second network function, a rule comprising at least one tethering policy to be applied to tethering traffic, and at least one traffic policy to be applied to other non-tethering traffic, wherein the rule is determined based on the first policy.

According to some embodiments there is provided a first network function for applying a rule to tethering traffic. The first network function comprises processing circuitry configured to: receive, from a second network function, a request to create or update a session based on a rule, wherein the rule comprises at least one tethering policy to be applied to tethering traffic, and at least one traffic policy to be applied to other non-tethering traffic, wherein each of the at least one tethering policy to be applied to the tethering traffic comprises one of more of: an identification of one or more devices to which the tethering policy is to be applied; an indication that the tethering policy is to be applied to all tethered traffic; a list of device types either allowed to tether for the session or allowed to tether for the one or more services in the session; a condition relating to a number of tethered devices, wherein the tethering policy is to be applied when the condition is fulfilled.

According to some embodiments there is provided a second network function for applying a rule to tethering traffic. The second network function comprises processing circuitry configured to: transmit to a first network function a request to create or update a session based on a rule, wherein the rule comprises at least one tethering policy to be applied to tethering traffic, and at least one traffic policy to be applied to other non-tethering traffic, wherein each of the at least one tethering policy to be applied to the tethering traffic comprises one of more of: an identification of one or more devices to which the tethering policy is to be applied; an indication that the tethering policy is to be applied to all tethered traffic; a list of device types either allowed to tether for the session or allowed to tether for the one or more services in the session; a condition relating to a number of tethered devices, wherein the tethering policy is to be applied when the condition is fulfilled.

BRIEF DESCRIPTION OF THE DRAWINGS

For a better understanding of the embodiments of the present disclosure, and to show how it may be put into effect, reference will now be made, by way of example only, to the accompanying drawings, in which.

DETAILED DESCRIPTION

Figure 1:
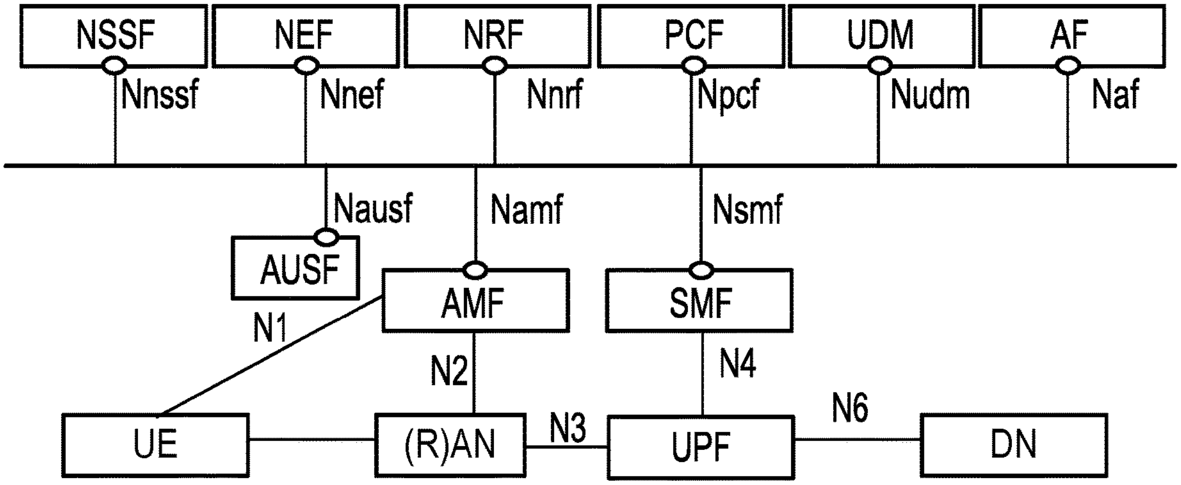
FIG. 1 illustrates a 5G reference architecture as defined by 3GPP.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Presently, it is not possible to take different decisions for a service (application), or in fact a PDU session, that is dependent on the number and type of different devices (for example, a laptop, a smart 4K TV) that are consuming tethering traffic behind a UE.

Furthermore, presently, multiple PCC rules need to be installed by the PCF when different enforcements (for example, QoS, blocking traffic, charging) need to be applied for a service depending on whether the service is directly consumed by the UE handling the PDU session, or being tethered to a different device behind the UE. That is, two different application identifications (appIds) have to be configured in order to provide two separate PCC rules for the same service depending on whether the service is tethered or not.

Additionally, multiple PCC rules are currently required to enable different enforcement actions to be applied to each tethered device (behind the UE). For example, a first PCC rule would be required for a first tethering device 1, and a second PCC rule would be required for a second tethering device.

Additionally, network operators will likely want to apply differentiated treatment (for example, different rating groups for Charging, different QoS handling, different access control) to traffic matching a certain service dependent on a subscriber profile. When the traffic is tethered, the network operators still will likely apply differentiated treatment in case the service traffic is tethered or not.

Presently (3GPP TS 29.244), in order to apply tethering policies both on a per subscriber and on a per service basis, there is a need to duplicate the number of PDRs that SMF provisions to UPF for each service (for example, one PDR for a first service without tethering and another PDR for the first service with tethering). This implies complex configuration for the network operator and high amounts of signaling in the N4 interface.

Additionally, the enforcement actions (for example, Access Control, Charging/Reporting, QoS) related to tethering policies may potentially result in multiple combinations. An example is shown below for a first service here, where the tethering policy could be either:

Differentiated Charging/Reporting for the service's tethered traffic. In this case, the SMF will need to install the following URRs/FARs/QERs:

| Service | URR | FAR | QER |
|---|---|---|---|
| Tethering | URR1 | FAR1 | QER1 |
| No tethering | URR2 | FAR1 | QER1 |

Differentiated Access Control (for example, drop tethered traffic) for the service's tethered traffic. In this case, the SMF will need to install the following URRs/FARs/QERs:

| Service | URR | FAR | QER |
|---|---|---|---|
| Tethering | URR1 | FAR1 | QER1 |
| No tethering | URR1 | FAR2 | QER1 |

Differentiated QoS for the service's tethered traffic. In this case, the SMF will need to install the following URRs/FARs/QERs:

| Service | URR | FAR | QER |
|---|---|---|---|
| Tethering | URR1 | FAR1 | QER1 |
| No tethering | URR1 | FAR1 | QER2 |

Differentiated Charging/Reporting and Access Control for the service's tethered traffic. In this case, the SMF will need to install the following URRs/FARs/QERs:

| Service | URR | FAR | QER |
|---|---|---|---|
| Tethering | URR1 | FAR1 | QER1 |
| No tethering | URR2 | FAR2 | QER2 |

Differentiated Charging/Reporting and QoS for the service's tethered traffic. In this case, the SMF will need to install the following URRs/FARs/QERs:

| Service | URR | FAR | QER |
|---|---|---|---|
| Tethering | URR1 | FAR1 | QER1 |
| No tethering | URR2 | FAR1 | QER2 |

Differentiated Access Control and QoS for the service's tethered traffic. In this case, the SMF will need to install the following URRs/FARs/QERs:

| Service | URR | FAR | QER |
|---|---|---|---|
| Tethering | URR1 | FAR1 | QER1 |
| No tethering | URR1 | FAR2 | QER2 |

Differentiated Charging/Reporting, Access Control and QoS for the service's tethered traffic. In this case, the SMF will need to install the following URRs/FARs/QERs:

| Service | URR | FAR | QER |
|---|---|---|---|
| Tethering | URR1 | FAR1 | QER1 |
| No tethering | URR2 | FAR2 | QER2 |

The above combinations result in complex provisioning for the network operator and high amounts of signaling in the N7/N4 interfaces. Additionally, the example above is just for a single service, and assumes that enforcement actions do not depend on the number of tethering devices. For example, for each service there could be different enforcement actions, for example blocking a first service tethered traffic while allowing a second service's tethered traffic but with a low bandwidth.

Embodiments described herein propose methods and apparatuses that solve the above problems, for example, by utilizing an extended rule (corresponding to one or more services, or corresponding to a session) in order to provide dynamic enforcement actions for both the case in which the traffic is consumed by the master UE (e.g. traffic that is not tethered), and the case in which any other device behind the master UE is performing tethering (e.g. tethering traffic).

The embodiments described herein may be implemented, for example, by extending the N7 and N4 interfaces to enable the application of different enforcements to traffic consumed by tethering devices.

For simplicity, herein the embodiments are described with reference to a 5G architecture. It will however be appreciated that, although the embodiments described herein relate to 5G network architecture, similar embodiments may be implemented in a 4G network architecture, by replacing, for example: PCF by PCRF, UDR by SPR, AMF by MME, SMF by PGW-C or TDF-C and UPF by PGW-U or TDF-U. Similarly, the embodiments described herein may equally be extended to any future network architectures such as a $6^{th}$ Generation (6G) network architecture, for example, by implementing the functionality of the 5G network functions in appropriate nodes in any core network.

Figure 2:
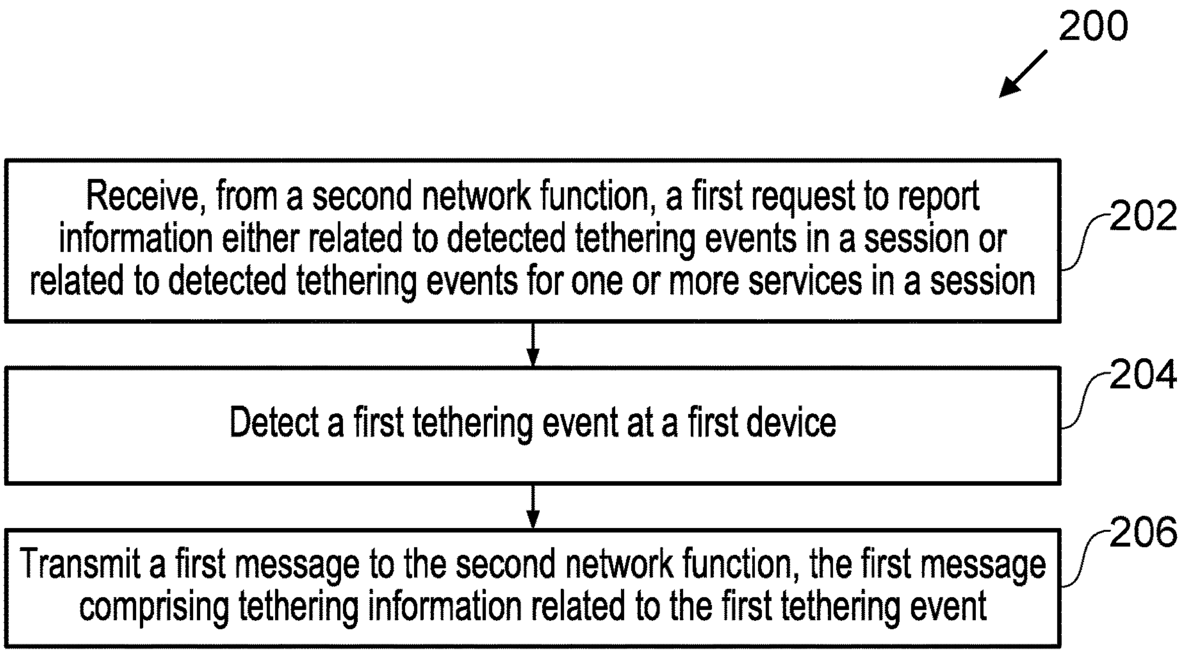
FIG. 2 illustrates a method performed at a first network function for obtaining information relating to tethering events.

FIG. 2 illustrates a method 200 performed at a first network function for obtaining information relating to tethering events. The first network function may be implemented in a first network node. The first network node may comprise a physical or virtual node, and may be implemented in a computing device or server apparatus and/or in a virtualized environment, for example in a cloud, edge cloud or fog deployment. The first network function may comprise a UPF.

At step 202, the first network function receives from a second network function, a first request to report information either related to detected tethering events in a session or related to detected tethering events for one or more services in a session. That is, the first network function may be requested to report information relating to any tethering traffic in a session (regardless of the service consumed), or to report information relating to tethering traffic that is consuming only specific services.

The second network function may be implemented in a second network node. The second network node may comprise a physical or virtual node, and may be implemented in a computing device or server apparatus and/or in a virtualized environment, for example in a cloud, edge cloud or fog deployment. The second network function may comprise an SMF.

In some embodiments, the first request may further comprise a request to establish or modify the session. For example, the first request may comprise a PCFP Session Establishment or Modification request (as will be described later with reference to FIGS. 8 and 9).

In some embodiments, the request to establish or modify the session may be based on a first rule, wherein the first rule is to be applied to traffic either in the session or for the one or more services in the session. The first rule may be based at least in part on a first policy to be applied either to tethering traffic in the session or to tethering traffic for the one or more services in the session. The first policy may indicate that the second network function should report information relating either to detected tethering events in the session or to detected tethering events for the one or more services in the session. For example, the first policy may indicate that the second network function should report to the first network function when tethering events for the first service start and/or stop.

However, in other embodiments, the first request may be transmitted separately from a request to establish or modify the session. For example, in some embodiments, the first request may be transmitted as part of a newly defined tethering event message.

In some embodiments, the first request may comprise a request to report one or more of: a device identification (for example, a deviceID) of any device either performing tethering events in the session or performing tethering events for the one or more services in the session; and a device type (for example, a laptop device, a smart 4K TV device) of any device either performing tethering events in the session or performing tethering events for the one or more services in the session.

At step 204, the first network function detects a first tethering event at a first device.

For example, it will be appreciated that an extension of the PFCP protocol (that is, an extension of the N4 interface) to create a new UPF capability related to tethering detection and enforcement may be negotiated between the SMF and the UPF.

For example, the UPF features presently defined in 3GPP TS 29.244 may be extended as follows:

| | Feature | | |
|---|---|---|---|
| Octet/Bit | Feature | Interface | Description |
| 10/2 | TDEU | N4 | UPF support of Tethering detection and enforcement. |

At step 206, the first network function transmits a first message to the second network function, the first message comprising tethering information related to the first tethering event. In some embodiments, the tethering information may comprise one or more of: an indication that tethering has either been detected in the session or been detected for one of the one or more services in the session, an identification of the first device (for example, a deviceID); and an identification of a device type of the first device (for example, a laptop device, a smart 4K TV device). The tethering information reported by the second network function may be dictated by what was requested in the first request.

In some embodiments, the first rule may comprise a policy and charging control, PCC, rule or a session rule. It will be appreciated that a session rule may enable enforcements to be applied to traffic of a session independently of the service that is being consumed, whereas a PCC rule may specify enforcements that are to be applied to one or more services that are being consumed.

In some embodiments, the method 200 may further comprise receiving, from the second network function, a second request to modify the session based on a second rule. The second rule may comprise at least one tethering policy to be applied to tethering traffic of the first tethering event, and at least one traffic policy to be applied to either other non-tethering traffic in the session or other non-tethering traffic for one or more services in the session. Similarly to as for the first rule, it will be appreciated that the second rule may comprise a PCC rule or a session rule.

It will be appreciated that the provision of this second request enables the first network function to apply the at least one tethering policy to tethering traffic of the first tethering event, and to apply the at least one traffic policy to either other non-tethering traffic in the session or other non-tethering traffic for one or more services in the session. It should be noted that, contrary to existing solutions, only one rule (e.g. the second rule) is therefore required in order to enable different treatment of the tethering traffic and the non-tethering traffic.

It will be appreciated that the second rule may be formed based at least in part on the tethering information transmitted in step 206. How the second rule may be determined will now be described in greater detail with reference to the method 300 of FIG. 3.

Figure 3:
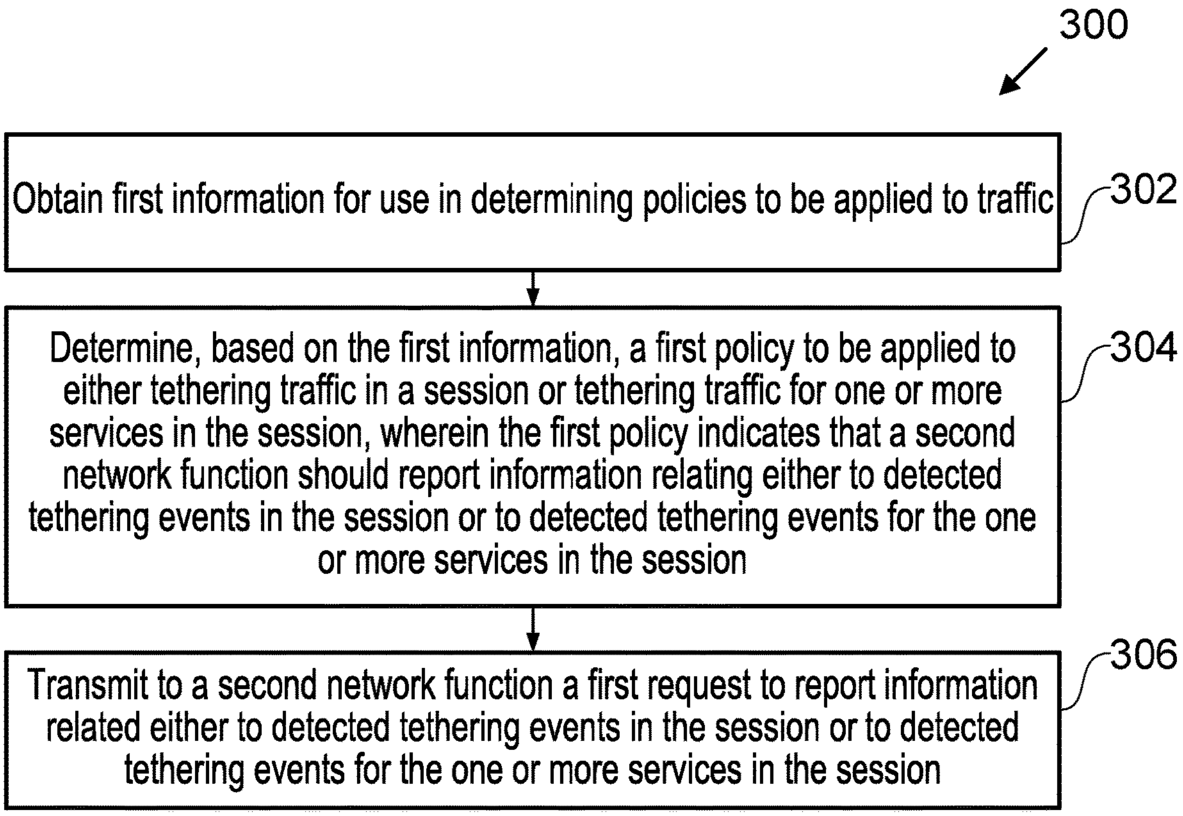
FIG. 3 illustrates a method performed at a third network function for obtaining information relating to tethering event.

FIG. 3 illustrates a method 300 performed at a third network function for obtaining information relating to tethering events. The first network function may be implemented in a third network node. The third network node may comprise a physical or virtual node, and may be implemented in a computing device or server apparatus and/or in a virtualized environment, for example in a cloud, edge cloud or fog deployment. The third network function may comprise a PCF.

At step 302, the third network function obtains first information for use in determining policies to be applied to traffic.

In some embodiments, at least part of the first information may be received from a fourth network function (for example, a UDR). For example, at least part of the first information may comprise extended subscription information received from the UDR.

In some embodiments, existing session management subscription information may be extended such that it comprises information relating to tethering support per S-NSSAI/DNN. In some embodiments, this new information may be indicated by extending the existing data type "SmPolicyDnnData", as currently defined in 3GPP TS 29.519, with a new attribute.

For example, the data type "SmPolicyDnnData" presently defined in 3GPP TS 29.519 may be extended to define the following attribute:

| Attribute name | Data type | P | Cardinality | Description | Applicability |
|---|---|---|---|---|---|
| tethering | map(TetheringInformation) | O | 1 . . . N | Information about Tethering | |

The new attribute TetheringInformation may be defined to comprise the following:

| Attribute name | Data type | P | Cardinality | Description | Applicability |
|---|---|---|---|---|---|
| appId | String | M | 1 | Identifies the appId for which tethering information is provided | tethering |
| tetheringNotAllowed | boolean | O | 0 . . . 1 | Identifies whether Tethering is allowed or not. Set to "true" if no Tethering is allowed; otherwise set to "false". The default value is "false". | tethering |
| tetheringMaxDevices | Integer | O | 0 . . . 1 | Maximum number of allowed tethering devices | tethering |
| tetheringAllowedDeviceTypes | array (string) | O | 1 . . . N | Includes the list of allowed device types for tethering for the service | tethering |

In some embodiments, the at least part of the first information received from the fourth network function may comprise one or more of: an identification of the one or more services to which the at least part of the first information applies, an indication as to whether tethering is allowed for the session or for the one or more services, a maximum number of devices allowed to tether for the session or for the one or more services (for example, 3 devices), a list of device types allowed to tether for the session or for the one or more services (for example, a laptop device, a smart 4K device).

Additionally or alternatively, in some embodiments, least part of the first information may comprise network operator policies. For example, a network operator may define that tethering traffic is always to be blocked for a particular type of service.

At step 304, the third network function determines, based on the first information, a first policy to be applied to either tethering traffic in a session or tethering traffic for one or more services in the session. The first policy may indicate that a second network function should report information relating either to detected tethering events in the session or to detected tethering events for the one or more services in the session. For example, the first policy may indicate that the second network function should report to the third network function when tethering events for the first service start and/or stop.

For example, in some embodiments, a currently defined rule such as a PCC rule or a session rule, may be extended to create the first rule such that the first rule further comprises an attribute that defines that a second network function should report information relating either to detected tethering events in the session or to detected tethering events for the one or more services in the session.

For example, a PCC rule may be extended such that it comprises a "tetheringReporting" attribute. This "tetheringReporting" attribute may indicate that the SMF is to detect and report tethered traffic associated with the PCC rule. In some embodiments, the "tetheringReporting" attribute may further indicate that an identifier of the device and/or an identifier of the type of device that is performing the tethering is to additionally be reported by the SMF. In some embodiments, the "tetheringReporting" attribute.may be connected with the Application Detection and Control (ADC) feature.

For example, the type PCC rule presently defined in 3GPP TS 29.512 may be extended to define the following attribute:

| Attribute name | Data type | — | Cardinality | Description | Applicability |
|---|---|---|---|---|---|
| tetheringReporting | Enum 0, 1, 2 | — | — | 0 means no tethering detection 1 means tethering is reported 2 means tethering is reported including deviceId | Tethering |

It will be appreciated that alongside this provision of an extended first rule, application detection may also be requested for the first service. This request for application detection may be implemented using standard 3GPP mechanisms (for example, comprising a PCT APP_STA/APP_STO).

In some embodiments, Application Detection Information IE within Usage Report IE presently defined in 3GPP TS 29.244 may be extended to define the following further information element (IE):

| Information elements | P | Condition/Comment | | | | Appl. |
|---|---|---|---|---|---|---|
| Tethering Information | O | When present, this IE shall contain the tethering information for the detected application. It shall be present, when reporting the start of an application, if the Reduced Application Detection Information flag was not set in the Measurement Information and if the tethering reporting is enabled in the corresponding URR. | — | X | X | X | Tethering Information |

The Tethering Information IE within the Application Detection Information IE may be defined as follows:

| | | Octet 1 and 2<br>Tethering Information IE Type = X (decimal)<br>Octets 3 and 4<br>Length = n | | | | | |
|---|---|---|---|---|---|---|---|
| | | | Appl. | | | | |
| Information elements | P | Condition/Comment | Sx a | Sx b | Sx c | N4 | IE Type |
| Tethering Device ID | C | When present, this IE shall identify the Tethering Device Identifier for which a start or stop of traffic is reported. It shall be present, when reporting the start of an application, if the Reduced Application Detection Information flag was not set in the Measurement Information, if the tethering reporting is enabled in the corresponding URR and if tethering reporting indicated the need to report the Tethering Device. | — | X | X | X | Tethering Device ID |
| Flow Information | O | When present, this IE shall contain the flow information for the tethering device. | — | X | X | X | Flow Information |
| Device Type ID | C | When present, this IE shall identify the Device Type for which a start or stop of traffic is reported. It shall be present, when reporting the start of an application, if the Reduced Application Detection Information flag was not set in the Measurement Information, if the tethering reporting is enabled in the corresponding URR and if tethering reporting indicated the need to report the Device Type. | — | X | X | X | Device Type ID |

At step 306, the third network function transmits to a second network function a first request to report information related either to detected tethering events in the session or to detected tethering events for the one or more services in the session. That is, the second network function may be requested to report information relating to any tethering traffic in the session (regardless of the service consumed), or to report information relating to tethering traffic consuming only specific services.

In some embodiments, the method 300 may further comprise the step of transmitting a first rule to a second network function, wherein the first rule is to be applied to either traffic of the session or traffic for one or more services in the session, and wherein the first rule is based at least in part on the first policy. It will be appreciated that the first rule may be a legacy rule, that is, to be applied to all traffic consumed by the UE, regardless whether the traffic is tethered or not tethered.

As described above with reference to FIG. 2, the first rule may comprise a policy and charging control, PCC, rule or a session rule.

In some embodiments, the method 300 may further comprise the step of transmitting the first rule and the first request as part of a first message, wherein the first message comprises a response to a request to create or update the session. For example, the first request and first rule may be transmitted as part of a "Ncpf_SMPolicyControl_Create response" message.

As described above, the first request may comprise a request to report one or more of: a device identification (for example, a deviceID) of any device performing tethering events either in the session or for the one or more services in the session; and a device type of any device performing tethering events either in the session or for the one or more services in the session (for example, a laptop device, a smart 4K TV device).

In some embodiments, the method 300 may further comprise the step of receiving tethering information from the second network function related to a first tethering event at a first device, wherein the first tethering event is either in the session or for the one of the one or more services in the session. The tethering information may be defined as described above with reference to FIG. 2.

It will be appreciated that, with reference to the method of FIG. 2, that the first request may effectively therefore be passed from the third network function (e.g. PCF) to the second network function (SMF) and then on to the first network function (e.g. UPF). The first rule (e.g. a PCC rule) may also be passed between the network functions in a similar manner. The tethering information may be passed from the first network function to the second network function and then on to the third network function.

It will be appreciated that the format of the first request, the first rule and the tethering may be modified at the second network function. For example, the format of the first request may be different in step 202 of FIG. 2 and step 306 of FIG. 3. Similarly, the format of the first rule may be different when transmitted from the third network function to the second network and when transmitted from the second network function to the first network function. Similarly, the format of the tethering information may be different when transmitted from the first network function to the second network and when transmitted from the second network function to the third network function.

In some embodiments, the method 300 may further comprise the step of determining a second policy based on the tethering information and the first information, and updating the first rule, based on the second policy, to form a second rule, wherein the second rule comprises at least one tethering policy to be applied to tethering traffic of the first tethering event, and at least one traffic policy to be applied to other non-tethering traffic in the session or other non-tethering traffic for the one or more services in the session.

For example, in embodiments in which the first rule comprises a PCC rule, the PCC rule may be extended such that it comprises one or more attributes that map to one of more policies to be applied to tethering traffic in the session.

For example, the PCC rule may comprise one or more of the following attributes, "refQosTethData", "refChgTethData", "refUmTethData" and "refTcTethData".

The data type PccRule as presently defined in 3GPP TS 29.512 may be extended to define the attributes "refQosTethData", "refChgTethData", "refUmTethData" and "refTcTethData" as follows:

| Attribute name | Data type | — | Cardinality | Description | Applicability |
|---|---|---|---|---|---|
| refQosTethData | map(QosData) | — | — | A reference to the QosData policy decision type only applicable to tethered traffic. The key used in this map for each entry is the qosId attribute of the corresponding QosData. | Tethering |
| refTcTethData | map(TrafficControlData) | — | — 1 . . . N | A reference to the TrafficControlData policy decision type only applicable to the tethered traffic. The key used in this map for each entry is the tcId attribute of the corresponding TrafficControlData. | |
| refChgTethData | map(ChargingData) | — | — | A reference to the ChargingData policy decision type only applicable to tethered traffic. The key used in this map for each entry is the chgId attribute of the corresponding ChargingData | Tethering |
| refUmTethData | map(UsageMonitoringData) | — | — | A reference to the UsageMonitoringData policy decision type only applicable to tethered traffic. The key used in this map for each entry is the umId attribute of the corresponding UsageMonitoringData. | Tethering |

Each of the attributes refQosTethData", "refChgTethData", "refUmTethData" and "refTcTethData" may map to one or more policies (e.g. defined by instances of "QoS-data", "ChgData", "TethData" and "UsageMonitoringData" respectively). That is, in some embodiments, the at least one tethering policy comprises one or more of: one or more traffic control policies to be applied to tethering traffic, one or more quality of service policies to be applied to tethering traffic, one or more charging policies to be applied to tethering traffic, and one or more usage monitoring policies to be applied to tethering traffic.

As an example, the at least one tethering policy may comprise a first traffic control policy, wherein the first traffic control policy comprises a policy to block at least some of the tethering traffic. For example, the tethering policy may indicate that the first service is to be blocked if the service is consumed for two or more devices behind the UE.

In some embodiments, the one or more attributes that define each of one of more policies to be applied to tethering traffic in the session may further comprise one or more conditions, wherein the one or more conditions indicate that the relevant policy should only be applied to tethering traffic when the one or more conditions have been fulfilled. For example, an instance of "QosData" (it will be appreciated that "refQosTethData" may map to a plurality of "QosData" instances) may comprise a condition that defines that the corresponding quality of service policy should only be applied to tethered traffic for devices that are of a certain device types. That is, the provision of a conditional attribute in such a manner may enable more granular enforcement to be applied to tethering traffic that is based on certain conditions.

For example, an instance of data type "QosData" as presently defined in 3GPP TS 29.512 may be extended to define the following attributes to indicate that the relevant policy (as otherwise defined in the instance of "QoSData") should only be applied to tethering traffic when one or more conditions have been fulfilled:

| Attribute name | Data type | P | Cardinality | Description | Applicability |
|---|---|---|---|---|---|
| deviceId | String | O | 0 . . . 1 | Device Identifier If deviceId is present the Tethering QoS policy decision is applied only to that deviceId (as previously reported by SMF) | Tethering |
| deviceType | String | O | 0 . . . 1 | Device Type If deviceType is present the Tethering QoS policy decision is applied only to that deviceType | Tethering |
| numberTethDevices | ConditionType | O | 0 . . . 1 | This policy decision applies when the condition about the number of ongoing devices is fulfilled. e.g. numberTethDevices ">2" or "<=3) | Tethering |

For example, the data type "TrafficControlData" as presently defined in 3GPP TS 29.512 may be extended to define the following attributes to indicate that the relevant policy (as otherwise defined in the instance of "TrafficControlData") should only be applied to tethering traffic when one or more conditions have been fulfilled:

| Attribute name | Data type | P | Cardinality | Description | Applicability |
|---|---|---|---|---|---|
| deviceId | String | O | 0 . . . 1 | Device Identifier If deviceId is present the Tethering TrafficControl policy decision is applied only to that deviceId (as previously reported by SMF) | Tethering |
| deviceType | String | O | 0 . . . 1 | Device Type If deviceType is present the Tethering Traffic policy decision is applied only to that deviceType | Tethering |
| numberTethDevices | ConditionType | O | 0 . . . 1 | This policy decision applies when the condition about the number of ongoing devices is fulfilled. Eg. numberTethDevices ">2" or "<=3) | Tethering |

For example, the data type "ChargingData" as presently defined in 3GPP TS 29.512 may define the following attributes to indicate that the relevant policy (as otherwise defined in the instance of "Charging Data") should only be applied to tethering traffic when one or more conditions have been fulfilled:

| Attribute name | Data type | P | Cardinality | Description | Applicability |
|---|---|---|---|---|---|
| deviceId | String | O | 0 . . . 1 | Device Identifier If deviceId is present the Tethering Charging policy decision is applied only to that deviceId (as previously reported by SMF) | Tethering |
| deviceType | String | O | 0 . . . 1 | Device Type If deviceType is present the Tethering Charging policy decision is applied only to that deviceType | Tethering |
| numberTethDevices | ConditionType | O | 0 . . . 1 | This policy decision applies when the condition about the number of ongoing devices is fulfilled. Eg. numberTethDevices “>2” or “<=3) | Tethering |

For example, the data type “UsageMonitorData” as presently defined in 3GPP TS 29.512 may define the following attributes to indicate that the relevant policy (as otherwise defined in the instance of “UsageMonitoringData”) should only be applied to tethering traffic when one or more conditions have been fulfilled:

| Attribute name | Data type | P | Cardinality | Description | Applicability |
|---|---|---|---|---|---|
| deviceId | String | O | 0 . . . 1 | Device Identifier If deviceId is present the Tethering UsageMonitoring policy is applied only to that deviceId (as previously reported by SMF) | Tethering |
| deviceType | String | O | 0 . . . 1 | Device Type If deviceType is present the Tethering UsageMonitoring policy is applied only to that deviceType | Tethering |
| numberTethDevices | ConditionType | O | 0 . . . 1 | This policy decision applies when the condition about the number of ongoing devices is fulfilled. Eg. numberTethDevices “>2” or “<=3) | Tethering |

That is, in some embodiments, each of the at least one tethering policy to be applied to the tethering traffic may comprise one of more of: an identification of one or more devices to which the tethering policy is to be applied, an indication that the tethering policy is to be applied to all tethered traffic, a list of device types either allowed to tether for the session or allowed to tether for the one or more services in the session, and a condition relating to a number of tethered devices, wherein the tethering policy is to be applied when the condition is fulfilled.

The skilled person will appreciate that a session rule may be extended in a similar manner to as described above to define one of more policies to be applied (potentially conditionally) to tethering traffic in the session. It will be appreciated that support of PCC and Session rule extensions may be negotiated between SMF and PCF, for example, with a new supported feature “Tethering”.

In some embodiments, the method 300 may further comprise the step of transmitting the second rule to the second network function.

It will therefore be appreciated that the formation of the second rule comprising at least one tethering policy to be applied to tethering traffic of the first tethering event, and at least one traffic policy to be applied to other non-tethering traffic in the session or other non-tethering traffic for the one or more services in the session, enables different enforcements to be applied to non-tethering and tethering traffic of the first service via the provision of a single rule. For example, the third network function may install a single rule for a first service that defines a first quality of service policy to be applied to non-tethering traffic, and a second quality of service policy to be applied to tethering traffic.

It will also be appreciated that in embodiments in which the reporting of information related to detected tethering events in the session is requested, receipt of this information may enable the third network function (for example, the PCF) to request dynamically different enforcement to be applied to be applied to each different device performing tethering behind the UE. For example, on reception of a device identification and a device type for the first device, the PCF may request an enforcement to be applied to the first device that is based on network operator policies specifically relating to devices of the device type.

In general network operator policies may depend one or more of: a number of devices tethering behind the first device, the types of devices tethering behind the first device, the time at which tethering is being performed, the location of the first device, the access type of the first device, and the RAT-type being used by the first device.

Additionally, the provision of the tethering information and the first information to the third network function may enable the third network function to make dynamic policy decisions that are to be applied to tethering and non-tethering traffic in a session.

Figure 4:
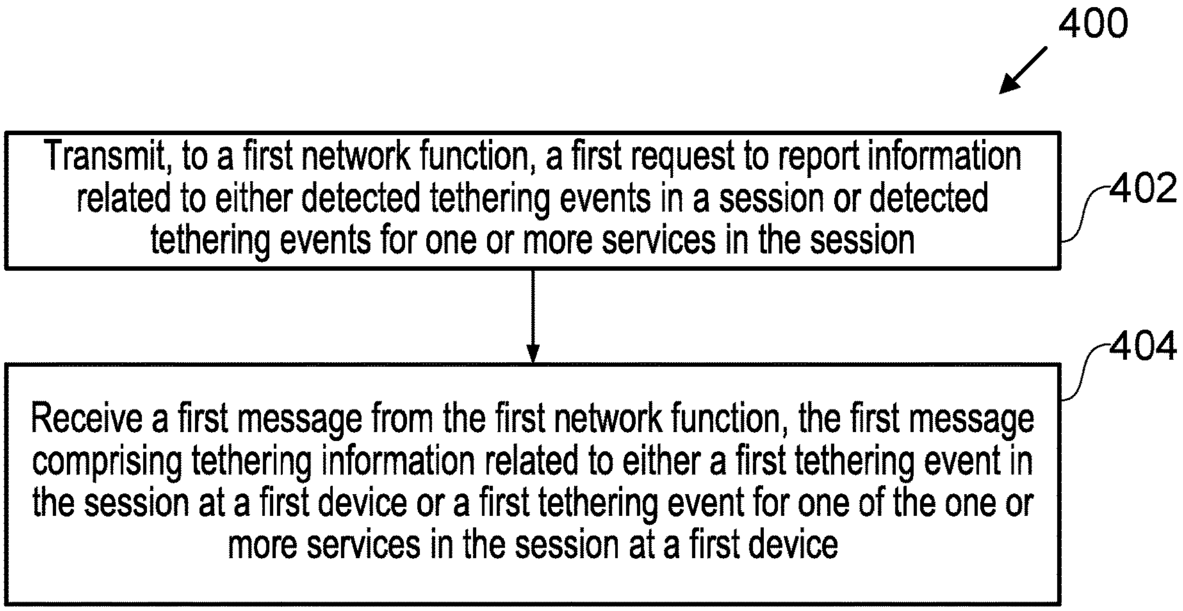
FIG. 4 illustrates a method performed at a second network function for obtaining information relating to tethering events.

FIG. 4 illustrates a method 400 performed at a second network function for obtaining information relating to tethering events. The second network function may be implemented in a second network node. The second network node may comprise a physical or virtual node, and may be implemented in a computing device or server apparatus and/or in a virtualized environment, for example in a cloud, edge cloud or fog deployment. The second network function may comprise a SMF.

At step 402, the second network function transmits, to a first network function, a first request to report information related to either detected tethering events in a session or detected tethering events for one or more services in the session. In some embodiments, the second network function first receives, from the third network function, the first request to report information related to either detected tethering events for the session or detected tethering events for the one or more services in the session. As previously described the format of the first request may be changed at the second network function. In particular, the first request may be transmitted to the first network function as part of a PFCP Session Modification Request. The first request may be received from the third network function as part of an Npcf_SMPolicyControl_Create response.

In some embodiments, the first request may be defined as described above with reference to FIGS. 2 and 3.

In some embodiments, in which a PCC rule is installed with a new attribute for reporting, and application detection is requested for a corresponding application identification (appId) following standard 3GPP mechanisms (for example, including a PCT APP_STA/APP_STO), the SMF may include, in an activation report of application traffic, extended information related to tethering. In some embodiments, the extended information may comprise information such as an identifier of the device performing the detected tethering and/or the type of the device performing the detected tethering. In some embodiments, the extended information be comprised in an "AppDetectionInfo" attribute.

For example, the data type "AppDetectionInfo" as presently defined in 3GPP TS 29.512 may be extended to define the following attributes:

| Attribute name | Data type | P | Cardinality | Description | Applicability |
|---|---|---|---|---|---|
| tethering | boolean | O | 0 . . . 1 | Indicates if the detected application is using tethering or not. Set to "true" if tethering is detected; otherwise set to "false". Default value "false" | Tethering |
| deviceId | String | O | 0 . . . 1 | Device Identifier | Tethering |
| deviceType | String | O | 0 . . . 1 | Device Type | Tethering |

In some embodiments, in order to transmit the first request from the second network function to the first network function, the "update URR IE" within a PFCP Session Modification Request as presently defined in 3GPP TS 29.244 may be extended as follows (extension indicated in bold type):

| | | | | | | | |
|---|---|---|---|---|---|---|---|
| Measurement Information | C | This IE shall be included if any of the following flag is set to "1". Applicable flags are: | | | | | Measurement Information |
| | | Measurement Before QoS Enforcement Flag: this flag shall be set to "1" if the traffic usage before any QoS Enforcement is requested to be measured. | — | X | X | X | |
| | | Inactive Measurement Flag: this flag shall be set to "1" if the measurement shall be paused (inactive). The measurement shall be performed (active) if the bit is set to "0" or if the Measurement Information IE is not present in the Create URR IE. | — | X | — | X | |
| | | Reduced Application Detection Information Flag: this flag may be set to "1", if the Reporting Triggers request to report the start or stop of application, to request the UP function to only report the Application ID in the Application Detection Information, e.g. for envelope reporting. | — | X | — | X | |

-continued

| | | | | | |
|---|---|---|---|---|---|
| | Immediate Start Time Metering Flag: this flag may be set to "1" if time-based measurement is used and the UP function is requested to start the time metering immediately at receiving the flag . . . | — | X | X | X |
| | Measurement of Number of Packets Flag: this flag may be set to "1" when the Volume-based measurement applies, to request the UP function to report the number of packets in UL/DL/Total in addition to the measurement in octet. | X | X | X | X |
| | **Tethering Detection Information Flag: this flag may be set to "1", if the Reporting Triggers request to report the start or stop of application, and specifically to request the UP function to report Tethering detection information in the Application Detection Information** | — | X | — | X |
| | **Tethering Device Identifier Flag: this flag may be set to "1", if the Reporting Triggers request to report the Tethering Device Identifier in the Application Detection Information** | — | X | — | X |
| | **Tethering Device Type Flag: this flag may be set to "1", if the Reporting Triggers request to report the Tethering Device Type in the Application Detection Information** | — | X | — | X |

In some embodiments, in order to transmit the first request from the second network function to the first network function, the "Create URR IE" within the PFCP Session Establishment Request as presently defined in 3GPP TS 29.244 may be extended as follows (extension indicated in bold type):

| | | | | | | | |
|---|---|---|---|---|---|---|---|
| Measurement Information | C | This IE shall be included if any of the following flag is set to "1". Applicable flags are: | | | | | Measurement Information |
| | | Measurement Before QoS Enforcement Flag: this flag shall be set to "1" if the traffic usage before any QoS Enforcement is requested to be measured. | — | X | X | X | |
| | | Inactive Measurement Flag: this flag shall be set to "1" if the measurement shall be paused (inactive). The measurement shall be performed (active) if the bit is set to "0" or if the Measurement Information IE is not present in the Create URR IE. | — | X | — | X | |
| | | Reduced Application Detection Information Flag: this flag may be set to "1", if the Reporting Triggers request to report the start or stop of application, to request the UP function to only report the Application ID in the Application Detection Information, e.g. for envelope reporting. | — | X | — | X | |
| | | Immediate Start Time Metering Flag: this flag may be set to "1" if time-based measurement is used and the UP function is requested to start the time metering immediately at receiving the flag . . . | — | X | X | X | |
| | | Measurement of Number of Packets Flag: this flag may be set to "1" when the Volume-based measurement applies, to request the UP function to report the number of packets in UL/DL/Total in addition to the measurement in octet. | X | X | X | X | |
| | | **Tethering Detection Information Flag: this flag may be set to "1", if the Reporting Triggers request to report the start or stop of application, and specifically to request the UP function** | — | X | — | X | |

-continued

| | | | | |
|---|---|---|---|---|
| to report Tethering detection information in the Application Detection Information | | | | |
| Tethering Device Identifier Flag: this flag may be set to "1", if the Reporting Triggers request to report the Tethering Device Identifier in the Application Detection Information | — | X | — | X |
| Tethering Device Type Flag: this flag may be set to "1", if the Reporting Triggers request to report the Tethering Device Type in the Application Detection Information | — | X | — | X |

That is, as previously mentioned, the first request may further comprise a request to establish or modify the session. However, it will be appreciated that the first request may be transmitted separately from a request to establish or modify the session.

In some embodiments, the method 400 further comprises further comprises receiving, from the third network function a first rule. The first rule may be defined as described above with reference to FIGS. 2 and 3.

In some embodiments, for example those in which the first request comprises a request to establish or modify the session, the step of applying the first rule to traffic in the session or to traffic for the one or more services in the session may comprise basing the request to establish or modify the session on the first rule. For example, in some embodiments, the PFCP protocol may be extended with a new Tethering Rules IE in a Create/Modify PDR IE at the PFCP Session Establishment/Modification Request, in order to indicate the tethering policies on a per service basis.

At step 404, the second network function receives a first message from the first network function, the first message comprising tethering information related to either a first tethering event in the session at a first device or a first tethering event for one of the one or more services in the session at a first device. The tethering information may be defined as described above with reference to FIGS. 2 and 3 (e.g. in step 206 of FIG. 2).

In some embodiments, the method 400 further comprises transmitting the tethering information to a third network function. The third network function may comprise a PCF, for example. This enables the third network function to form a second rule that is based at least in part on the transmitted tethering information, as described in greater detail with reference to FIG. 3.

In some embodiments, the method 400 further comprises further comprises receiving, from the third network function a second rule to apply to traffic for the session and applying the second rule either to traffic in the session or to traffic for the one or more services in the session. The second rule may be defined as described above with reference to FIG. 3.

It will be appreciated that this application of the second rule enables different enforcements to be applied to non-tethering and tethering traffic of the first service. For example, the second rule may indicate that, for a first service, a first quality of service policy is to be applied to non-tethering traffic, and a second quality of service policy is to be applied to tethering traffic.

In some embodiments, the step of applying the second rule may comprise transmitting, to the first network function, a third request to modify the session based on the second rule.

Figure 5:
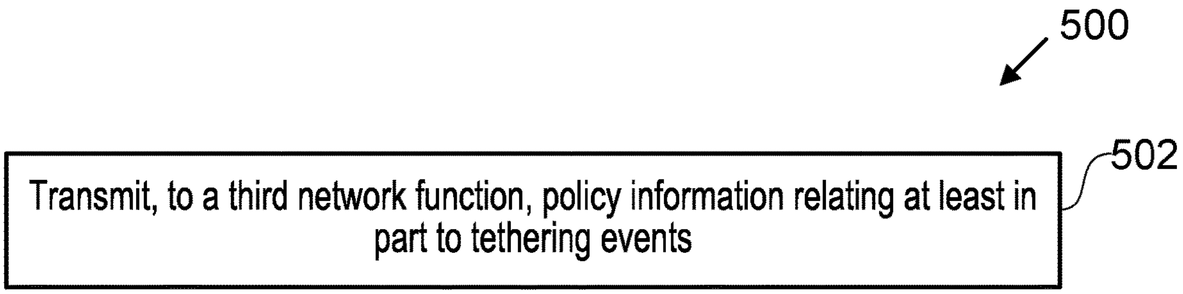
FIG. 5 illustrates a method performed in a fourth network function for providing first information for use in determining policies relating to tethering events.

FIG. 5 illustrates a method 500 performed at a fourth network function for providing first information for use in determining policies relating to tethering events. The fourth network function may be implemented in a fourth network node. The fourth network node may comprise a physical or virtual node, and may be implemented in a computing device or server apparatus and/or in a virtualized environment, for example in a cloud, edge cloud or fog deployment The fourth network function may comprise a UPF.

In step 502, the fourth network function transmits, to a third network function, policy information relating at least in part to tethering events, wherein the policy information comprises one or more of: an identification (for example, an appID) of one or more services to which a first part of the policy information applies, an indication as to whether tethering is allowed for the session or allowed for the one or more services, a maximum number of devices allowed to tether for the session or allowed to tether for the one or more services, and a list of device types (for example, a laptop device, a smart TV 4K device) allowed to tether for the session or allowed to tether for the one or more services.

Static Embodiments

It will be appreciated that in some embodiments, there may be no need to apply enforcements to the tethering traffic of a session that are dependent on dynamic conditions that may change during a PDU session lifecycle. That is, there may be no need to apply enforcements to the tethering traffic of a session that depend on factors such as, for example, time, location of the first device, access type of the first device or RAT-type associated with the first device. In these embodiments, there may therefore be no requirement to forward tethering information from the second network function to the third network function.

Therefore, in these embodiments, the method 400 as described with reference to FIG. 4 may comprise, responsive to receiving the first message, applying a second rule to traffic for the session, wherein the second rule comprises at least one tethering policy to be applied to the tethering traffic for the first tethering event, and at least one traffic policy to be applied to either other non-tethering traffic in the session or other non-tethering traffic for the one or more services in the session. That is, in these embodiments, the third network function does not need to provide an updated rule to the second network function, wherein the update would have been based on the tethering information that has not (in this embodiment) been forwarded to the third network function.

The at least one tethering policy in the second rule may be defined as described above with reference to FIGS. 2 and 3.

In these embodiments, the method 400 may further comprise receiving the second rule from a third network function. In these examples, the second network function may receive only the second rule from the third network function. Therefore the only rule transmitted to the second network function may comprise at least one tethering policy to be applied to the tethering traffic for the first tethering event, and at least one traffic policy to be applied to either other non-tethering traffic in the session or other non-tethering traffic for the one or more services in the session.

However, in some examples, the second network function may provide two different rules to the first network function. In other words, initially the second network function may assume that no tethering traffic is occurring, and may first transmit a first rule to the third network function, wherein the first rule is based on the traffic policy as defined in the second rule received from the third network function.

Then, responsive to receiving the tethering information from the first network function, the second network function may transmit a second rule to the first network function, where the second rule comprises the at least one tethering policy to be applied to the tethering traffic for the first tethering event as received in the second rule from the third network function.

An example of this implementation of the method of FIG. 4 is described in more detail with reference to FIG. 9.

Figure 6:
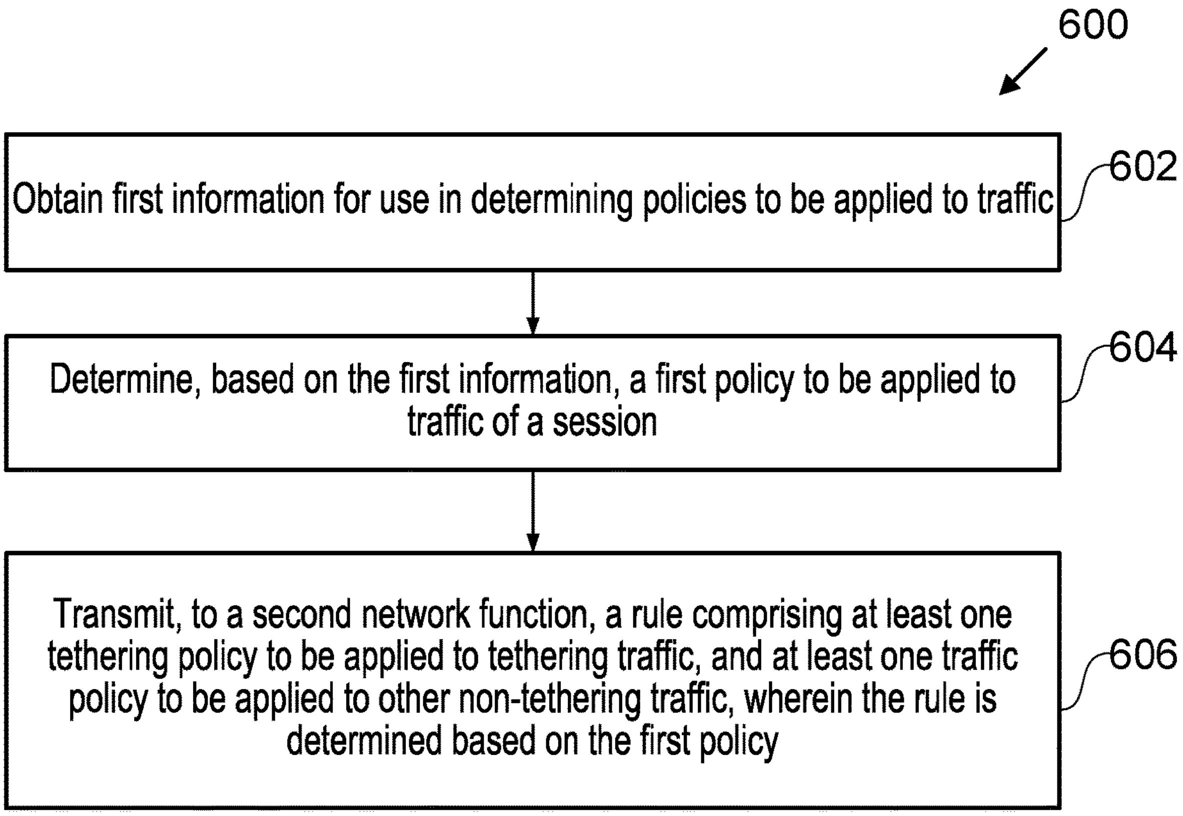
FIG. 6 illustrates a further method performed at a third network function for obtaining information relating to tethering events.
Figure 7:
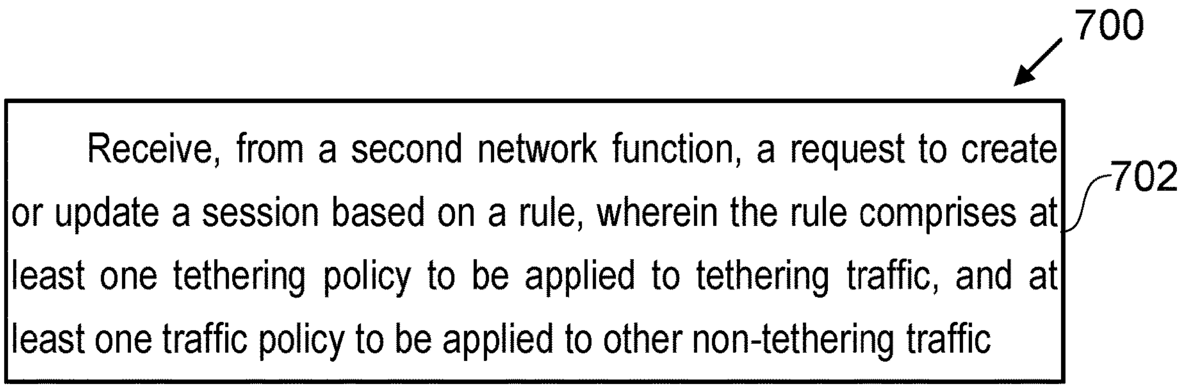
FIG. 7 illustrates a further method performed at a first network function for obtaining information relating to tethering events.
Figure 8:
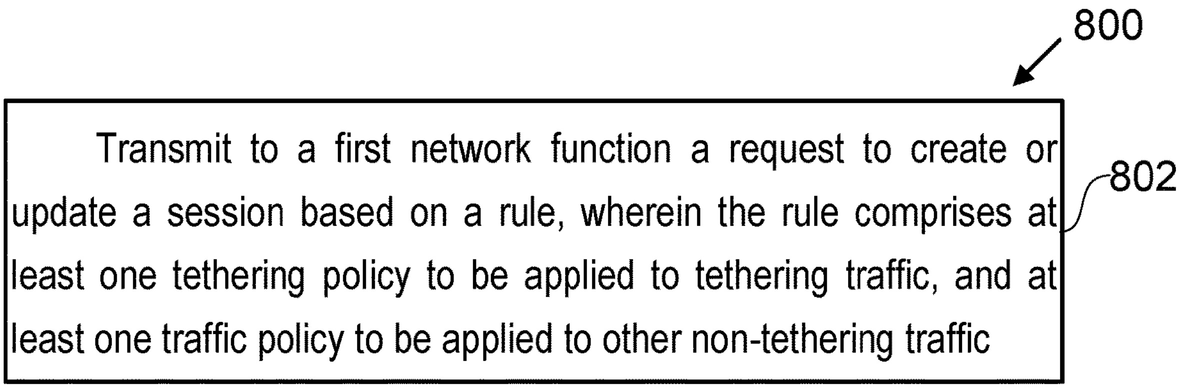
FIG. 8 illustrates a sequence diagram illustrating an example implementation of the methods of FIGS. 2 to 5.

As noted above, in some embodiments, there may be no need to apply enforcements to the tethering traffic of a session that are dependent on dynamic conditions that may change during a PDU session lifecycle. That is, there may be no need to apply enforcements to the tethering traffic of a session that depend on factors such as time, location of a UE, access type or RAT-type, for example. In these embodiments, there is no requirement to forward tethering information from the second network function to the third network function and/or to transmit tethering information from the first network function to the second network function. FIGS. 6 to 8 illustrate example methods performed by the third network function and the first network function respectively in static embodiments.

FIG. 6 illustrates a further method 600 performed at a third network function for obtaining information relating to tethering events. The third network function may be implemented in a third network node. The third network node may comprise a physical or virtual node, and may be implemented in a computing device or server apparatus and/or in a virtualized environment, for example in a cloud, edge cloud or fog deployment. The third network function may comprise a PCF. The method 600 may be utilized in examples in which there is no need to apply enforcements to the tethering traffic of a session that are dependent on dynamic conditions.

At step 602, the third network function obtains first information for use in determining policies to be applied to traffic. As noted above, in some embodiments, at least part of the first information may be received from a fourth network function.

At step 604, the third network function determines, based on the first information, a first policy to be applied to traffic of a session.

At step 606, the third network function transmits, to a second network function, a rule comprising at least one tethering policy to be applied to tethering traffic, and at least one traffic policy to be applied to other non-tethering traffic, wherein the rule is determined based on the first policy. The at least one tethering policy may be defined as described above with reference to FIGS. 2 to 4.

In some embodiments, the rule may comprise a policy and charging control, PCC, rule or a session rule.

FIG. 7 illustrates a method performed at a first network function for applying a rule to tethering traffic. The first network function may be implemented in a first network node. The first network node may comprise a physical or virtual node, and may be implemented in a computing device or server apparatus and/or in a virtualized environment, for example in a cloud, edge cloud or fog deployment. The first network function may comprise a UPF. The method 700 may be utilized in examples in which there is no need to apply enforcements to the tethering traffic of a session that are dependent on dynamic conditions.

At step 702, the first network function receives, from a second network function, a request to create or update a session based on a rule, wherein the rule comprises at least one tethering policy to be applied to tethering traffic, and at least one traffic policy to be applied to other non-tethering traffic. Each of the at least one tethering policy to be applied to the tethering traffic comprises one of more of: an identification of one or more devices to which the tethering policy is to be applied; an indication that the tethering policy is to be applied to all tethered traffic; a list of device types either allowed to tether for the session or allowed to tether for the one or more services in the session; and a condition relating to a number of tethered devices, wherein the tethering policy is to be applied when the condition is fulfilled.

It will be appreciated that this step enables the first network function to apply the at least one tethering policy to tethering traffic, and to apply the at least one traffic policy to either other non-tethering traffic.

In some embodiments, the at least one tethering policy to be applied to tethering traffic may be applied to tethering traffic either in the session or for the one or more services in the session, and the at least one traffic policy to be applied to other non-tethering traffic may be applied to non-tethering traffic either in the session or for the one or more services in the session.

In some embodiments, the rule may comprise a policy and charging control, PCC, rule or a session rule.

FIG. 8 illustrates a method, in a second network function for applying a rule to tethering traffic. The second network function may be implemented in a second network node. The second network node may comprise a physical or virtual node, and may be implemented in a computing device or server apparatus and/or in a virtualized environment, for example in a cloud, edge cloud or fog deployment. The second network function may comprise a SMF. The method 800 may be utilized in examples in which there is no need to apply enforcements to the tethering traffic of a session that are dependent on dynamic conditions.

In step 802 the second network function transmits, to the first network function, a request to create or update a session based on a rule, wherein the rule comprises at least one tethering policy to be applied to tethering traffic, and at least one traffic policy to be applied to other non-tethering traffic. Each of the at least one tethering policy to be applied to the tethering traffic comprises one of more of: an identification of one or more devices to which the tethering policy is to be applied; an indication that the tethering policy is to be applied to all tethered traffic; a list of device types either allowed to tether for the session or allowed to tether for the one or more services in the session; and a condition relating to a number of tethered devices, wherein the tethering policy is to be applied when the condition is fulfilled.

To exemplify the embodiments described above in FIGS. 2 to 8, use cases are described in the following figures.

Figure 9:
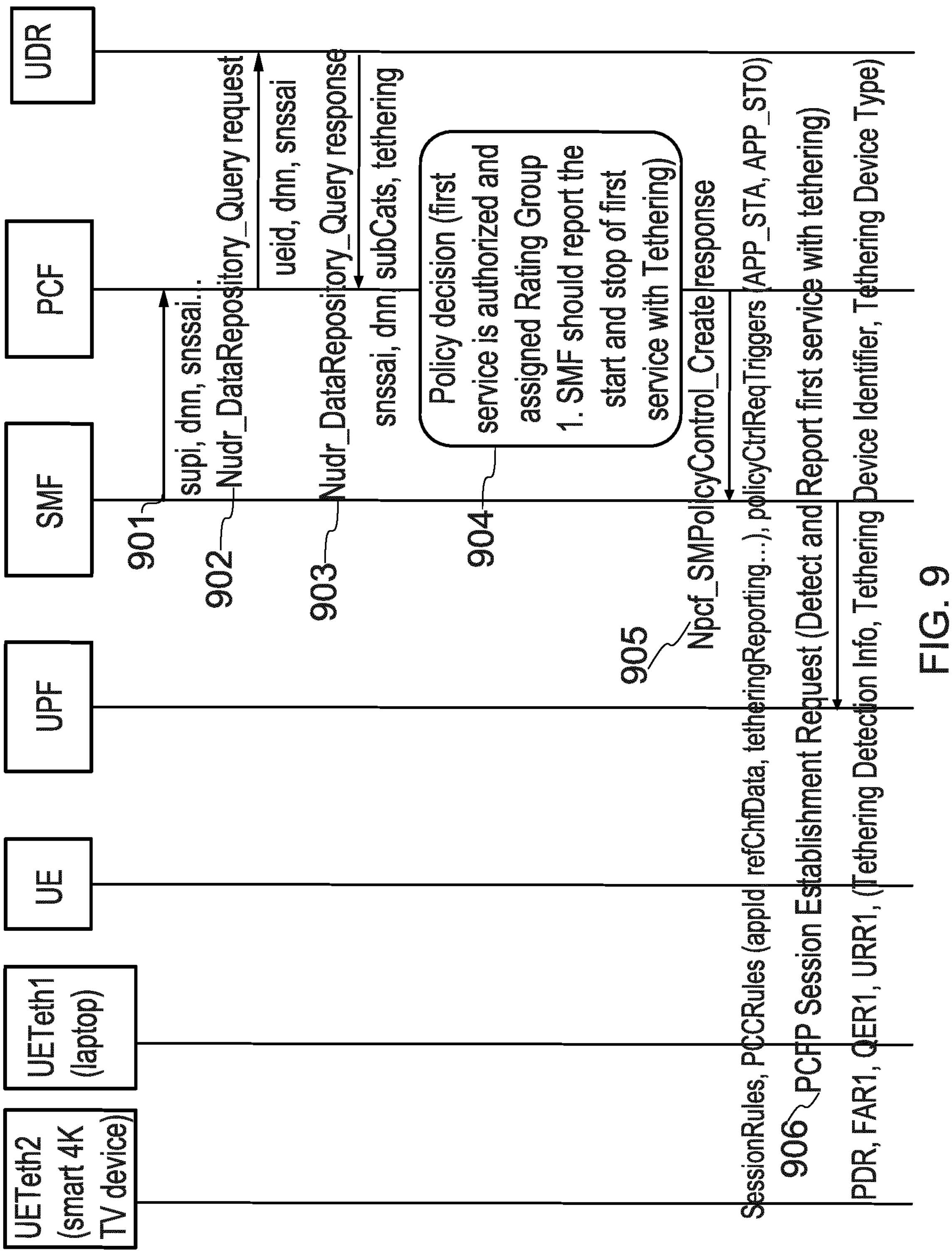
FIG. 9 illustrates a sequence diagram illustrating an example implementation of the methods of FIGS. 1, 3, 4 and 6.
Figure 9:
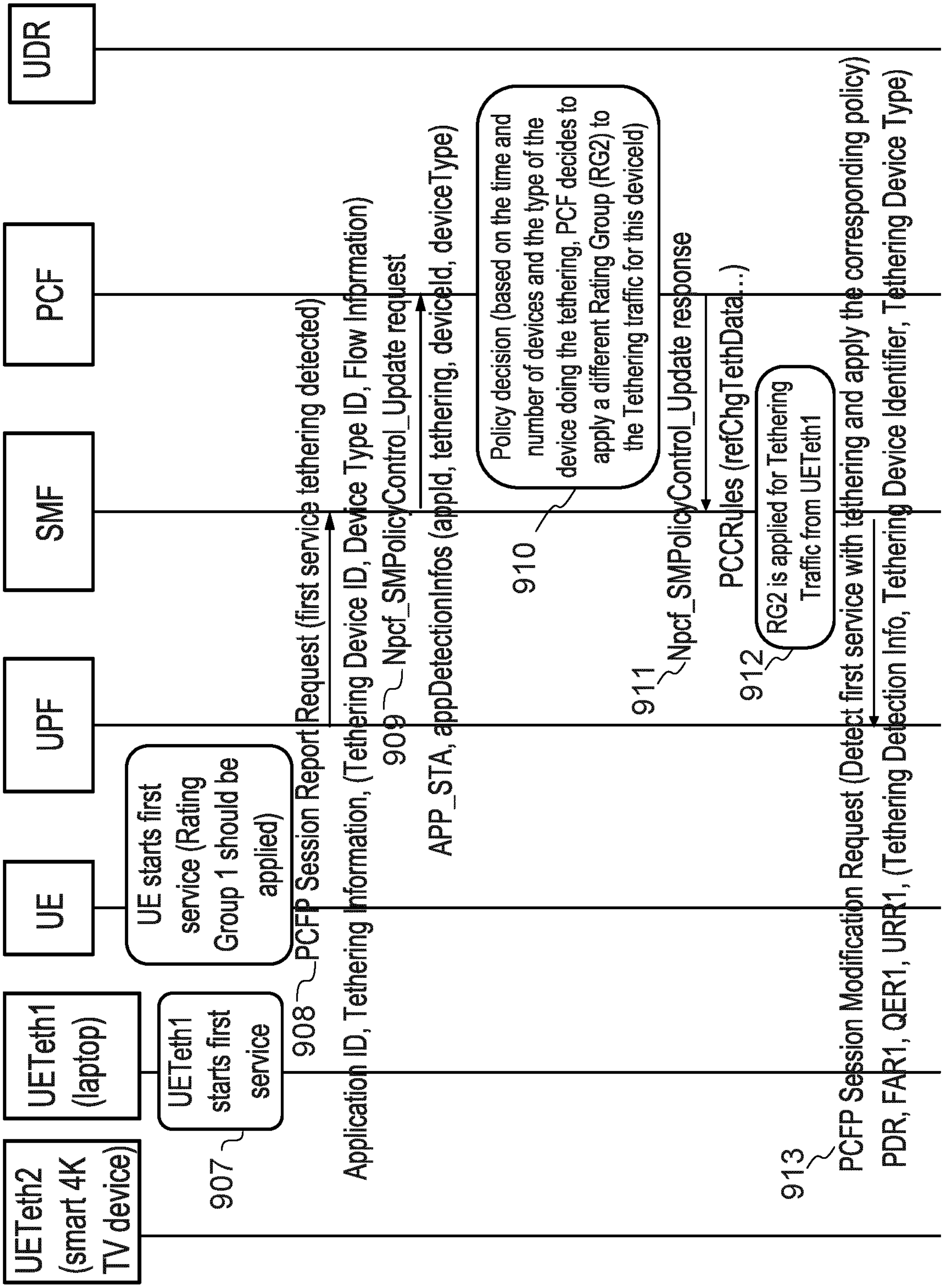
Figure 9:
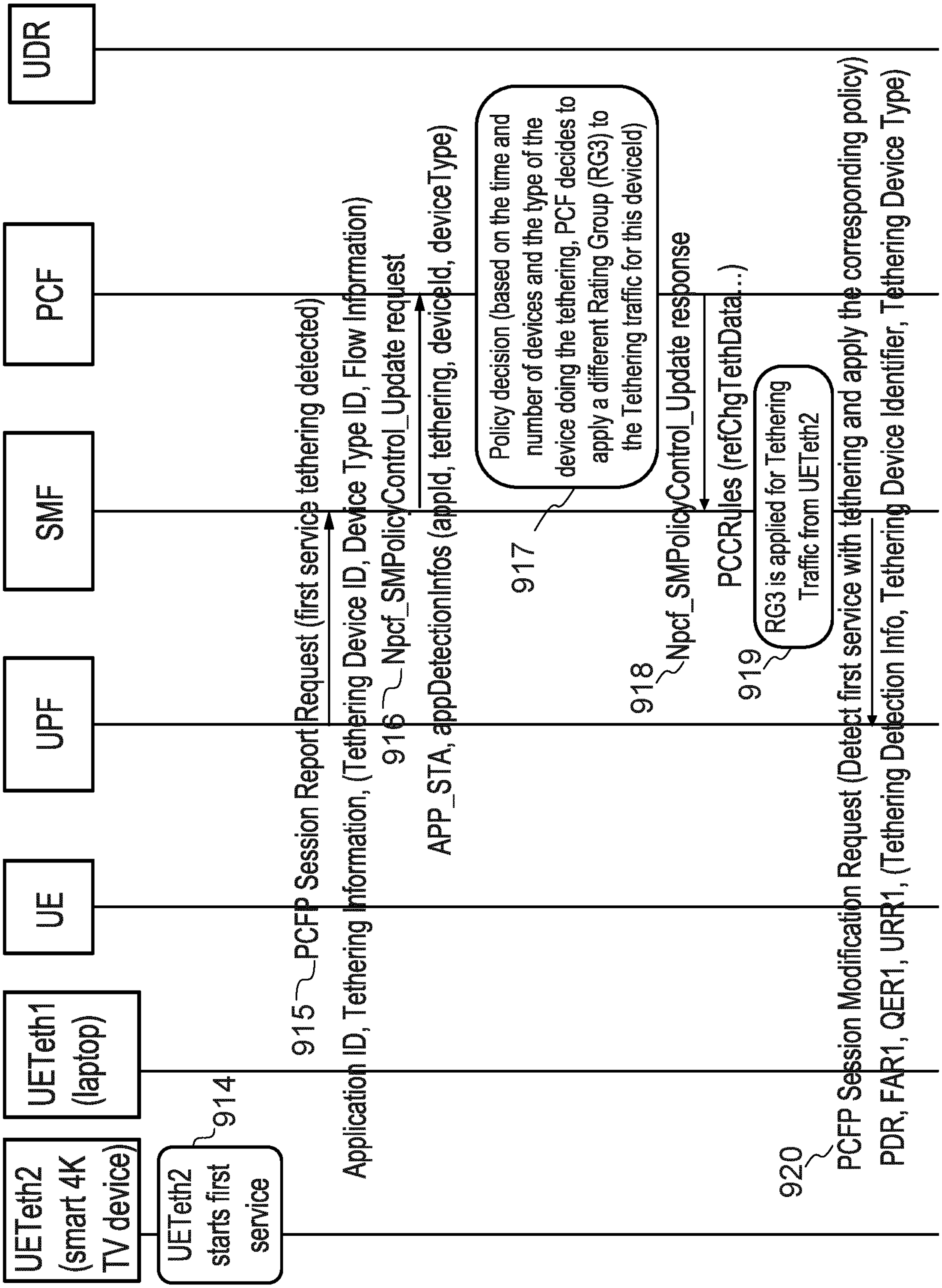

FIG. 9 is a sequence diagram illustrating an example implementation of the methods of FIGS. 2 to 5.

This sequence diagram illustrates how different charging may be dynamically applied by a PCF for traffic for a first service, depending on whether the traffic is consumed directly by a UE (in which case, RatingGroup1 is to be applied), by a laptop device tethering behind the UE (in which case, RatingGroup2 is to be applied), or by a 4K smart TV tethering behind the UE (in which case, RatingGroup3 is to be applied).

In this illustrated embodiment, it will be appreciated that the time and the location of the UE impacts the charging that is applied to the traffic of the devices that are tethering behind the UE.

In this illustrated embodiment, tethering policy data is provisioned in the UDR as subscriber policy data, and as network operator policies configured in PCF. Additionally, the PDU session establishment new supported feature "tethering" (as described above) may have been negotiated between PCF and SMF.

Additionally, in this illustrated embodiment, policies associated to the first service are configured in PCF. These policies select the charging to apply when tethering is detected are based on the time, the number of devices tethering behind the UE, and device type of the device performing the detected tethering.

Furthermore, at PFCP Association procedure between UPF and SMF entities, the existing mechanism may be extended to report UPF capabilities with a new capability (Tethering detection and enforcement). It will be appreciated that this would allow SMF to know which UPFs support this capability, and may influence UPF selection.

At step 901, the SMF transmits a request for the establishment of a PDU session for a UE for a given Single Network Slice Selection Assistance Information (S-NSSAI)/ Data Network Name (DNN), to the PCF.

At step 902, the PCF transmits, to the UDR, a request to obtain policy information relating at least in part to tethering events. It will be appreciated that the obtained policy information may form at least part of obtained first information for use in determining policies to be applied to traffic.

In this illustrated embodiment, the policy information comprises session management policy data, and this session management policy data comprises tethering subscription data. It will be appreciated that the tethering subscription data may relate to the NSSAI/DNN combination and/or relate to one or more services. It will also be appreciated that the tethering subscription data may also comprise information relating to a maximum number of devices that are permitted to tether (behind the UE) and/or types of devices that are permitted to tether (behind the UE).

It will be appreciated that in some embodiments, at least part of the first information may be based on a network operator policy configured in the PCF. In this illustrated embodiment, a network operator policy has been configured in PCF to provide different rating groups for the first service that depends on the type of device executing the first service, and the time at which the execution occurs.

At step 903, the UDR transmits, to the PCF, the policy information relating at least in part to tethering events. In this illustrated embodiment, the UDR executes step 903 by transmitting a Nudr_DataRepository_Query response message to the PCF. The Nudr_DataRepository_Query response message may comprise the "Tethering" attribute as defined above.

That is, at step 903, the PCF obtains (part of) the first information for use in determining policies to be applied to traffic.

At step 904, based on the first information (e.g. the received tethering subscription data and the configured network operator policies), the PCF makes a policy decision and determines to install a first PCC rule. In this illustrated embodiment, the installed first PCC rule determines that a certain Rating Group (RG1) should be applied to the traffic that is consumed for the first service. In other words, this first PCC rule is a legacy rule that is to be applied to all traffic that is consumed by the UE for the first service, regardless of whether that traffic is tethered or not.

In other words, although the received tethering subscription data contains information which could be implemented as a policy by the PCF at this stage, the PCF may be considered to assume that, as there is not yet any indication of tethering occurring at the UE, the policy may be focused on tethering traffic, and may be updated as and when tethering traffic is detected.

Additionally, at step 904, the PCF activates an application traffic reporting notification, such that when tethering that is being performed at the UE for the first service, the tethering is reported. This may be executed extending the PCC rule to include the "tetheringReporting" attribute (as defined above). Additionally, the PCC rule may include the PCT event triggers APP_STA and APP_STO for the PDU session.

At step 905, the PCF transmits to the SMF a first request to report information related to detected tethering events for the first service in the session. Step 805 corresponds to step 306 of FIG. 3. Additionally, the PCF transmits the first PCC rule to the SMF. In this illustrated embodiment, the first PCC rule and the first request are transmitted as part of a first message, wherein the first message comprises a response to a request to create or update the session.

In this illustrated embodiment, the PCF executes the first message by transmitting a Npcf_SMPolicyControl_Create response message to the SMF. As noted above, in this illustrated embodiment, the Npcf_SMPolicyControl_Create response message comprises the first PCC rule, wherein the first PCC rule comprises the "tetheringReporting" attribute (as defined above), and the "appId" identifying the first service. However, it will be appreciated that in some embodiments, the Npcf_SMPolicyControl_Create response message may additionally or alternatively comprise a session rule, which may indicate that the defined enforcements are to be applied to the traffic regardless of the service being consumed.

At step 906, based on the received first PCC rule, the SMF transmits a first request to report information related to detected tethering events for the first service in the session, to the UPF. Step 906 corresponds to step 402 in FIG. 4. In this illustrated embodiment, the SMF executes this by transmitting a PFCP Session Establishment/Modification Request message to the UPF.

It will be appreciated, in this illustrated embodiment, the PFCP Session Establishment/Modification Request message further comprises the first PCC rule. However, in this stage the first PCC rule is transmitted in the format of the relevant PDRs/FARs/QERs/URRs to be applied to the traffic.

In this example, the PFCP Session Establishment/Modification Request message comprises a PDR (e.g. PDR1) with PDI of type application with appId that identifies the first service, and a FAR, a QER and a URR that correspond to PDR1 (for example, FAR1, QER1 and URR1) that are based on the received first PCC rule.

That is, in this illustrated embodiment, the PFCP protocol has been extended by extending the application start event to include a request for the UPF to report to the SMF when tethering is detected.

It will be appreciated in some embodiments, rather extending an application start event to include a request for the UPF to report to the SMF when tethering is detected, a new tethering event message may be defined separately that comprises a request for the UPF to report to the SMF when tethering is detected. It will be appreciated that such a tethering event message may further comprise tethering related information as defined above for the application start event.

At step 907, the UPF, detects a first tethering event at a first device for the first service. Step 807 corresponds to step 204 of FIG. 2. In some embodiments, the UPF may use TCP Options (for example, timestamp) to identify the tethering device.

In this illustrated embodiment, the device that is performing the tethering behind the UE is a laptop device.

At step 808, the UPF transmits a first message to the SMF, wherein the first message comprises tethering information related to the first tethering event. That is, the UPF reports information related to detected tethering events for the first service in the session to the SMF. Step 808 corresponds to step 206 of FIG. 2 and step 404 of FIG. 4.

In this illustrated embodiment, the UPF informs the SMF that a tethering event has been detected for the first service by transmitting a PFPC Session Report Request message to the SMF. This PFPC Session Report Request message comprises the appId of the first service, and tethering information relating to the detected tethering event, including an identifier of the device (device_1) performing the tethering and the type of detected device (a laptop device).

At step 909, the SMF transmits the tethering information to the PCF. That is, upon reception of a notification that a tethering event has been detected for the first service, SMF forwards this notification to the PCF. In this illustrated embodiment, the SMF executes this by transmitting a Npcf_SMPolicyControl_Update request to the PCF. The Npcf_SMPolicyControl_Update request comprises the appId of the first service, and tethering information relating to the detected tethering event, including an identifier of the device (device_1) performing the tethering and the type of detected device (a laptop device).

At step 810, the PCF determines a second policy based on the received tethering information and the first information, and updates the first PCC rule, based on the second policy, to form a second PCC rule, wherein the second PCC rule comprises at least one tethering policy to be applied to tethering traffic of the first tethering event, and at least one traffic policy to be applied to other non-tethering traffic in the session or other non-tethering traffic for the one or more services in the session.

In this illustrated embodiment, the PCF makes a policy decision based on the number of devices presently tethering (which may be determined based on the received tethering information), the device type of the first device and the time, and determines to apply a different rating group (RG2) to the first device. In this illustrated embodiment, this is achieved by adding a new attribute “refChgTethData” to the PCC rule, which points to the associated attribute “ChargingData” which identifies that ratingGroup=RG_2 (which identifies Rating Group 2) is to be applied to deviceId=device_1 (which identifies the first device).

At step 811, the PCF transmits the second PCC rule to the SMF. In this illustrated embodiment, this is executed by transmitting a Npcf_SMPolicyControl_Update response message to the SMF. In this example, the pcf_SMPolicyControl_Update response message comprises the second PCC rule comprising the ““refChgTethData” attribute as defined above.

At step 912, the SMF reads the updated information in the second PCC rule, and determines to apply a different policy (in this case, applying Rating Group 2) for the tethered traffic of the first device based on the updated information.

At step 913, the SMF applies the second PCC rule to traffic for the session. In this illustrated embodiment, this is executed by transmitting a PFCP Session Modification Request message to the UPF. The PFCP Session Modification Request message comprises the deviceId of the first device, and the policy that is to be applied to the tethered traffic from the first device. In this illustrated embodiment, the PFCP Session Modification Request message comprises relevant PDRs/FARs/QERs/URRs to be applied to the tethered traffic of the first device that are based on the second rule.

At step 914, the UPF, detects a second tethering event at a second device for the first service. In some embodiments, the UPF may use TCP Options (for example, timestamp) to identify the second device.

In this illustrated embodiment, the second device that is performing the tethering behind the UE is a smart 4K TV device.

At step 915, the UPF transmits a second message to the SMF, wherein the second message comprises tethering information related to the second tethering event.

In this illustrated embodiment, the UPF informs the SMF that a second tethering event has been detected for the first service by transmitting a PFPC Session Report Request message to the SMF. This PFPC Session Report Request message comprises the appId of the first service, and tethering information relating to the second tethering event, including an identifier of the device (device_2) doing tethering and the type of detected device (a smart 4K TV device).

At step 916, the SMF transmits the tethering information to the PCF. That is, upon reception of a notification that a tethering event has been detected for the first service, SMF forwards this notification to the PCF. In this illustrated embodiment, the SMF executes this by transmitting a Npcf_SMPolicyControl_Update request to the PCF. The Npcf_SMPolicyControl_Update request comprises the appId of the first service, and tethering information relating to the detected second tethering event, including an identifier of the device (device_2) doing tethering and the type of detected device (a smart 4K tv device).

At step 917, the PCF determines a third policy based on the further received tethering information and the first information, and updates the second PCC rule, based on the third policy, to form a third PCC rule, wherein the third PCC rule comprises at least one tethering policy to be applied to tethering traffic of the first tethering event, and at least one traffic policy to be applied to other non-tethering traffic in the session or other non-tethering traffic for the one or more services in the session.

In this illustrated embodiment, the PCF makes a policy decision based on the number of devices presently tethering (as determined from the further received tethering information), the device type of the second device, and the time, and determines to apply a different rating group (RG3) to the second device. In this illustrated embodiment, this is achieved by updating the “ChargingData” attribute such that the attribute additionally specifies that ratingGroup=RG_3

(which identifies Rating Group 3) is to be applied to the tethering traffic for deviceId=device_2 (which identifies the second device).

At step 818, the PCF transmits the third PCC rule to the SMF. In this illustrated embodiment, this is executed by transmitting a Npcf_SMPolicyControl_Update response message to the SMF. In this example, the Npcf_SMPolicyControl_Update response message comprises the third PCC rule.

At step 819, the SMF reads the updated information in the third PCC rule, and determines to apply Rating Group 3 to the tethered traffic of the second device, for the first service.

At step 820, the SMF applies the third PCC rule to traffic for the session. In this illustrated embodiment, this is executed by transmitting a PFCP Session Modification Request message to the UPF. The PFCP Session Modification Request message comprises the deviceId of the second device, and the policy that is to be applied to the tethered traffic from the second device, for the first service. In this illustrated embodiment, the PFCP Session Modification Request message comprises relevant PDRs/FARs/QERs/URRs to be applied to the tethered traffic of the second device for the first service that are based on the third rule.

Figure 10:
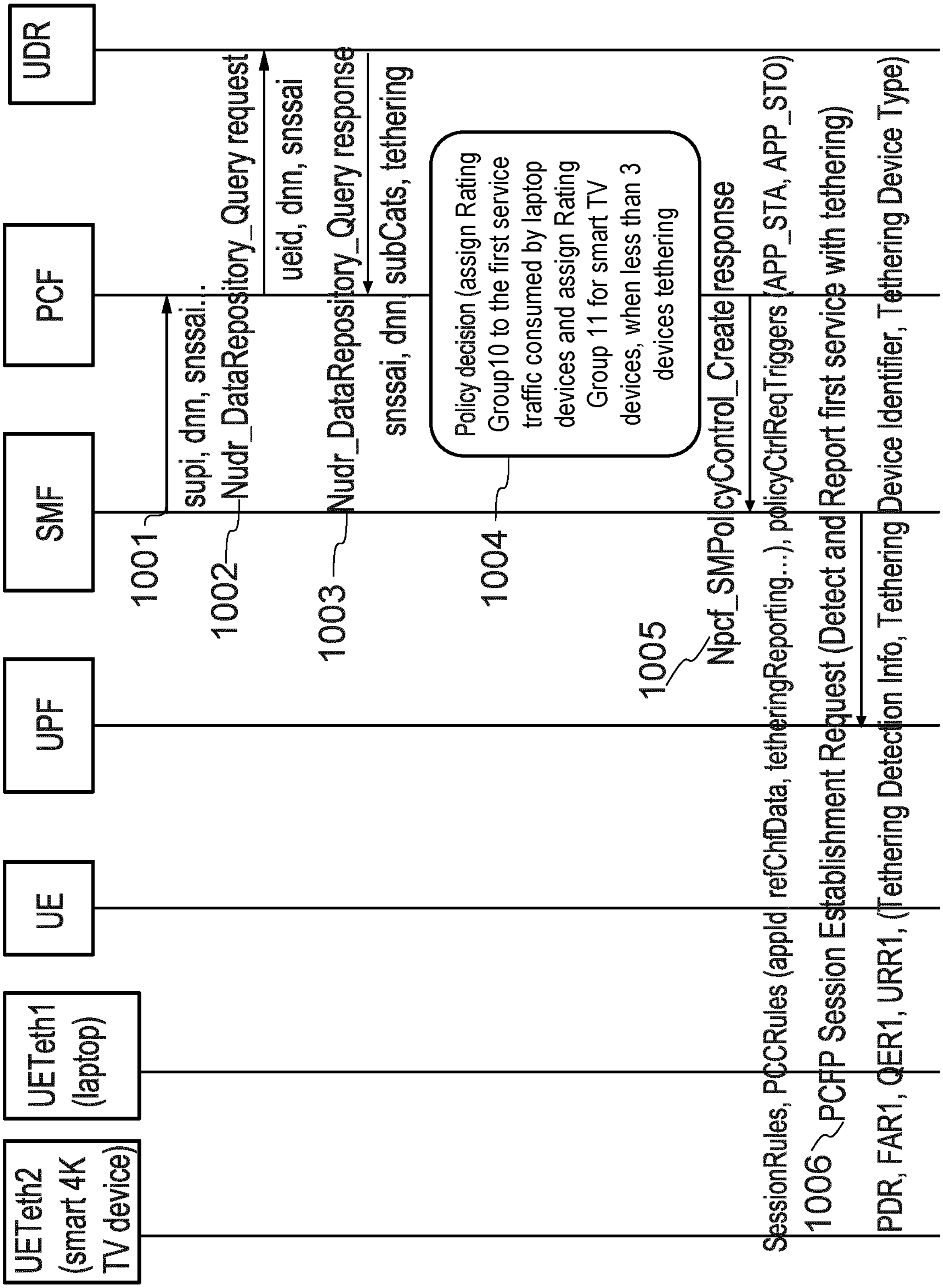
FIG. 10 illustrates a first network function comprising processing circuitry (or logic)
Figure 10:
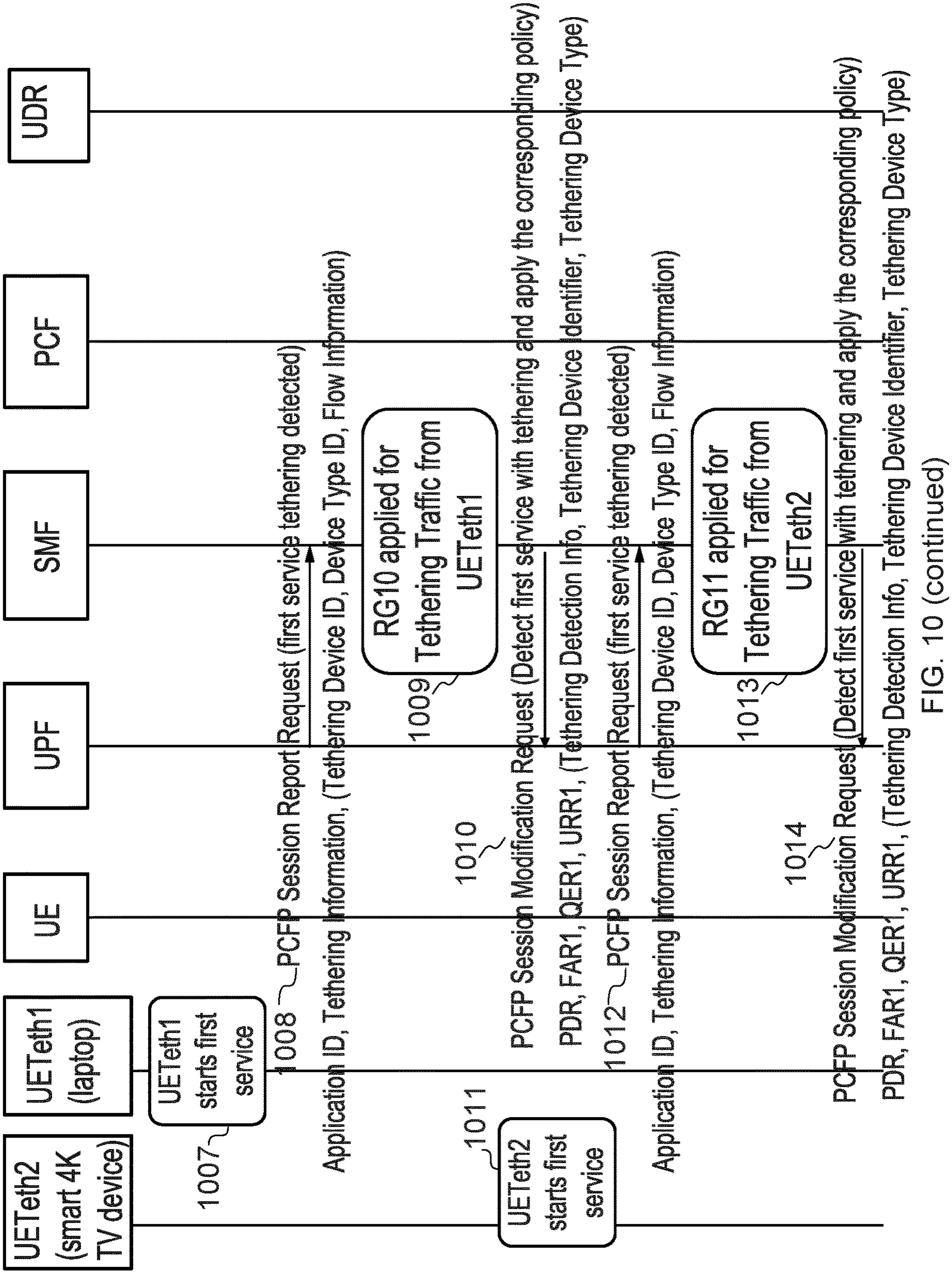

FIG. 10 is a sequence diagram illustrating an example implementation of the methods of FIGS. 2,4, 5 and 6.

It will be appreciated that in some embodiments, there may be no need to apply enforcements to the tethering traffic of a session that are dependent on dynamic conditions that may change during a PDU session lifecycle. That is, there may be no need to apply enforcements to the tethering traffic of a session that depend on factors such as time, location of a UE, access type or RAT-type, for example.

In such embodiments, the PCF will therefore not require (from the SMF) notifications relating to tethered traffic for a first service, which may include information relating to device type, or a device identifier, for example. In such embodiments, the PCF may decide at PDU session establishment (or when appropriate) to install the aforementioned tethering extensions in the PCC rules. These tethering extensions comprise the different enforcements that the SMF is to apply to tethered and non-tethered traffic. In some embodiments, the tethering extensions may additionally comprise conditions that are to be fulfilled in order for the enforcements to be applied (such as device type and a total number of devices tethering, for example).

In the illustrated example, the SMF then applies the tethering extension to the PCC rule dynamically (i.e. it requests to be notified of tethering events, and applies tetering policies based on the PCC rule received from the PCF dynamically). It will however, be appreciated that in some circumstances the SMF may also apply a PCC rule statically (i.e. without requiring any notification of tethering events from the UPF).

In the example of FIG. 10, a network operator wishes to apply ratingGroup=RG_10 to traffic being tethered by laptop devices for a first service, and ratingGroup=RG_11 for being tethered by smart TV devices for the first service, when the number of ongoing devices performing tethering behind a UE is less than 3.

In this illustrated embodiment, tethering policy data is provisioned in UDR as subscriber policy data, and as network operator policies configured in PCF. Additionally, the PDU session establishment new supported feature "tethering" (as described above) may have been negotiated between PCF and SMF.

Additionally, in this illustrated embodiment, policies associated to the first service are configured in PCF. These policies select the charging to apply when tethering is detected are based on the time, the number of devices tethering behind the UE, and device type of the device performing the detected tethering.

Furthermore, at PFCP Association procedure between UPF and SMF entities, the existing mechanism may be extended to report UPF capabilities with a new capability (Tethering detection and enforcement). It will be appreciated that this would allow SMF to know which UPFs support this capability, and may influence UPF selection.

At step 1001, the SMF transmits a request for the establishment of a PDU session for a UE for a given S-NSSAI/DNN to the PCF.

At step 1002, the PCF transmits, to the UDR, a request to obtain policy information relating at least in part to tethering events. It will be appreciated that the obtained policy information may form at least part of obtained first information for use in determining policies to be applied to traffic.

In this illustrated example, the policy information comprises session management policy data, wherein the session management policy data comprises tethering subscription data. It will be appreciated that the tethering subscription data may relate to the NSSAI/DNN combination and/or relate to one or more services. It will also be appreciated that the tethering subscription data may also comprise information relating to a maximum number of devices that are permitted to tether (behind the UE) and/or the types of devices that are permitted to tether (behind the UE).

It will be appreciated that in some embodiments, at least part of the first information may be based on a network operator policy configured in the PCF. In this illustrated embodiment, a network operator policy has been configured in PCF to provide different rating groups for the first service that depend on the type of device executing the first service, and the time at which this execution occurs.

At step 1003, the UDR transmits, to the PCF, policy information relating at least in part to tethering events. In this illustrated embodiment, the UDR executes step 1003 by transmitting a Nudr_DataRepository_Query response message to the PCF. The Nudr_DataRepository_Query response message may comprise the "Tethering" attribute as defined above.

That is, at step 1003, the PCF obtains (at least part of) the first information for use in determining policies to be applied to traffic. Step 1003 corresponds to step 603 of FIG. 6.

At step 1004, based on received tethering subscription data and the configured operator policies, the PCF makes a policy decision and determines to install a single PCC rule. In this illustrated embodiment, the installed PCC rule indicates that a certain Rating Group (RG_10) should be applied to the traffic consumed by laptop devices tethering behind the UE, for the first service. The installed PCC rule also indicates that another Rating Group (RG_11) should be applied to the traffic consumed by smart TV devices tethering behind the UE, when less than 3 devices are tethering behind the UE.

In this illustrated embodiment, this is achieved by installing a PCC rule that comprises two different instances in the map in the attribute "refChgTethData", which points to two different instances of "ChargingData", that include:

1. ratingGroup=RG_10, deviceType=laptop and numberTethDevices="<3".
2. ratingGroup=RG_11, deviceType=SmartTv and nfumberTethDevices="<3"

That is, at step 1004, the PCF determines, based on the first information, a first policy to be applied to traffic of a session. Step 1004 corresponds to step 604 of FIG. 6.

At step 1005, the PCF transmits, to the SMF, a rule comprising at least one tethering policy to be applied to tethering traffic, and at least one traffic policy to be applied to other non-tethering traffic, wherein the rule is determined based on the first policy. Step 1005 corresponds to step 606 of FIG. 6.

In this illustrated embodiment, the PCF executes this by transmitting a Npcf_SMPolicyControl_Create response message to the SMF. As noted above, in this illustrated embodiment, the Npcf_SMPolicyControl_Create response message comprises a PCC rule, wherein the PCC rule comprises the "refChgTethData", which points to the two aforementioned different instances of "ChargingData", and the "appId" identifying the first service. However, it will be appreciated that in some embodiments, the Npcf_SMPolicyControl_Create response message may additionally or alternatively comprise a session rule, which may indicate enforcements that are to be applied to the traffic regardless of the service being consumed.

At step 1006, based on the received extended PCC rule, the SMF transmits a first request to report information related to detected tethering events the first service in the session to the UPF. In this illustrated embodiment, the SMF executes this by transmitting a PFCP Session Establishment/Modification Request message to the UPF. Step 1006 corresponds to step 402 of FIG. 4.

It will be appreciated, in this illustrated embodiment, the PFCP Session Establishment/Modification Request message comprises relevant PDRs/FARs/QERs/URRs to be applied to the traffic that are based on the rule. As mentioned above, these PDRs/FARs/QERs/URRs may be based on the traffic policy to be applied to other non-tethering traffic.

In this example, the PFCP Session Establishment/Modification Request message will comprises a PDR (e.g. PDR1) with PDI of type application with appId that identifies the first service, and a FAR, a QER and a URR that correspond to PDR1 (for example, FAR1, QER1 and URR1) that are based on the rule.

That is, in this illustrated embodiment, the PFCP protocol has been extended by extending the application start event to include a request for the UPF to report to the SMF when tethering is detected. In some embodiments, the UPF may report tethering related information to the SMF such as a number of devices that are performing tethering behind the UE, identifiers of these devices, and device type information for these devices, for example.

It will be appreciated in some embodiments, rather than extending an application start event to include a request for the UPF to report to the SMF when tethering is detected, a new tethering event message may be defined separately that comprises a request for the UPF to report to the SMF when tethering is detected. It will be appreciated that such a tethering event message may further comprise tethering related information as defined above for the application start event.

At step 1007, the UPF, detects a first tethering event at a first device for the first service. In some embodiments, the UPF may use TCP Options (for example, timestamp) to identify the first device. Step 1007 corresponds to step 204 in FIG. 2.

In this illustrated embodiment, the first device that is performing the tethering behind the UE is a laptop device.

At step 1008, the UPF transmits a first message to the SMF, wherein the first message comprises tethering information related to the first tethering event. That is, the UPF reports information related to detected tethering events for the first service in the session to the SMF. Step 1008 corresponds to step 206 in FIG. 2 and step 404 in FIG. 4.

In this illustrated embodiment, the UPF informs the SMF that a tethering event has been detected for the first service by transmitting a PFPC Session Report Request message to the SMF. This PFPC Session Report Request message comprises the appId of the first service, and tethering information relating to the detected tethering event, including an identifier of the device (device_1) performing tethering and the type of detected device (a laptop device).

At step 1009, the SMF reads the information in the previously provisioned PCC rule, and determines to apply Rating Group 10 (RG_10) to the traffic of device_1 with deviceType=laptop for the first service, as less than 3 devices are tethering behind the UE.

At step 1010, the SMF applies the rule to traffic for the session, the rule comprising at least one tethering policy to be applied to tethering traffic, and at least one traffic policy to be applied to other non-tethering traffic, wherein the rule is determined based on the first policy. In other words, the SMF updates the PDRs/FARs/QERs/URRs such that they apply both the tethering policy that Rating Group 10 (RG_10) should apply to the traffic of device_1 with deviceType=laptop for the first service, and the at least one traffic policy.

At step 1011, the UPF, detects a second tethering event at a second device for the first service. In some embodiments, the UPF may use TCP Options (for example, timestamp) to identify the second device.

In this illustrated embodiment, the second device that is performing the tethering behind the UE is a smart 4K TV device.

At step 1012, the UPF transmits a second message to the SMF, wherein the second message comprises tethering information related to the second tethering event.

In this illustrated embodiment, the UPF informs the SMF that a second tethering event has been detected for the first service by transmitting a PFPC Session Report Request message to the SMF. This PFPC Session Report Request message comprises the appId of the first service, and tethering information relating to the detected second tethering event, including an identifier of the device (device_2) performing tethering and the type of detected device (a smart 4K TV device).

At step 1013, the SMF reads the information in the provisioned PCC rule, and determines to apply Rating Group 11 (RG11) for the traffic of device_2 with deviceType=SmartTV for the first service as less than 3 devices are tethering behind the UE.

At step 1014, the SMF applies the rule to traffic for the session, the rule comprising at least one tethering policy to be applied to tethering traffic, and at least one traffic policy to be applied to other non-tethering traffic, wherein the rule is determined based on the first policy. In other words, the SMF updates the PDRs/FARs/QERs/URRs such that they apply all of: the tethering policy that Rating Group 10 (RG_10) should apply to the traffic of device_1 with deviceType=laptop for the first service, the tethering policy that Rating Group 11 (RG_11) for the traffic of device_2 with deviceType=SmartTV for the first service, and the at least one traffic policy.

Figure 11:
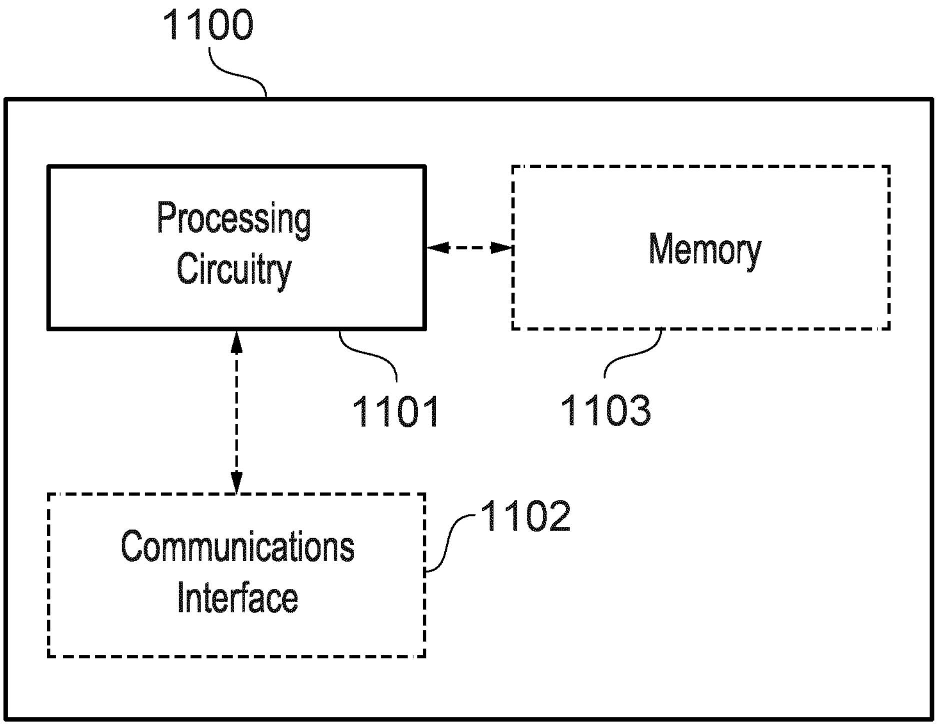
FIG. 11 illustrates a third network function comprising processing circuitry (or logic)

FIG. 11 illustrates a first network function 1100 comprising processing circuitry (or logic) 1101. The processing circuitry 1101 controls the operation of the first network function 1100 and can implement the method 200 described herein in relation to a first network function 1100. The processing circuitry 1101 can comprise one or more processors, processing units, multi-core processors or modules that are configured or programmed to control the first network function 1100 in the manner described herein. In particular implementations, the processing circuitry 1101 can comprise a plurality of software and/or hardware modules that are each configured to perform, or are for performing, individual or multiple steps of the method 200 described herein in relation to the first network function.

Briefly, the processing circuitry 1101 of the first network function 1100 is configured to:

receive, from a second network function, a first request to report information either related to detected tethering events in a session or related to detected tethering events for one or more services in a session; detect a first tethering event at a first device; and transmit a first message to the second network function, the first message comprising tethering information related to the first tethering event.

In some embodiments, the first network function 1100 may optionally comprise a communications interface 1102. The communications interface 1102 of the first network function 1100 can be for use in communicating with other nodes, such as other virtual nodes. For example, the communications interface 1102 of the first network function 1100 can be configured to transmit to and/or receive from other nodes requests, resources, information, data, signals, or similar. The processing circuitry 1101 of first network function 1100 may be configured to control the communications interface 1102 of the first network function 1100 to transmit to and/or receive from other nodes requests, resources, information, data, signals, or similar.

Optionally, the first network function 1100 may comprise a memory 1103. In some embodiments, the memory 1103 of the first network function 1100 can be configured to store program code that can be executed by the processing circuitry 1101 of the first network function 1100 to perform the method 200 described herein in relation to the first NF 1100. Alternatively, or in addition, the memory 1103 of the first network function 1100, can be configured to store any requests, resources, information, data, signals, or similar that are described herein. The processing circuitry 1101 of the first network function 1100 may be configured to control the memory 1103 of the first network function 1100 to store any requests, resources, information, data, signals, or similar that are described herein.

Figure 12:
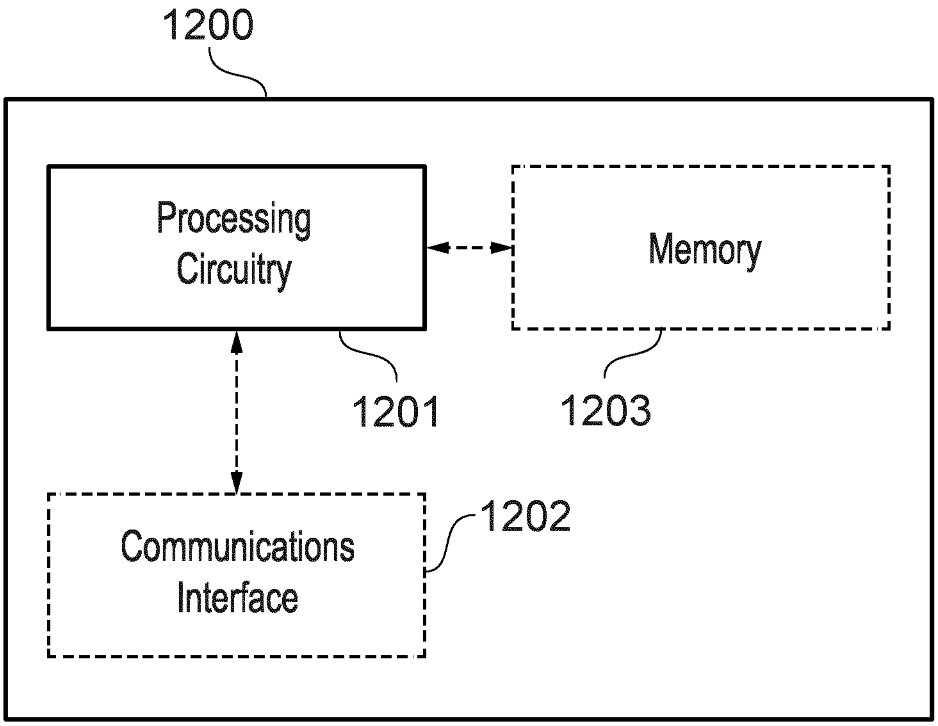
FIGS. 12 and 17 illustrates a second network function comprising processing circuitry (or logic)

FIG. 12 illustrates a third network function 1200 comprising processing circuitry (or logic) 1201. The processing circuitry 1201 controls the operation of the third network function 1200 and can implement the method 300 described herein in relation to a third network function 1200. The processing circuitry 1201 can comprise one or more processors, processing units, multi-core processors or modules that are configured or programmed to control the third network function 1200 in the manner described herein. In particular implementations, the processing circuitry 1201 can comprise a plurality of software and/or hardware modules that are each configured to perform, or are for performing, individual or multiple steps of the method 300 described herein in relation to the third network function.

Briefly, the processing circuitry 1201 of the third network function 1200 is configured to:

obtain first information for use in determining policies to be applied to traffic; determining, based on the first information, a first policy to be applied to either tethering traffic in a session or tethering traffic for one or more services in the session, wherein the first policy indicates that a second network function should report information relating either to detected tethering events in the session or to detected tethering events for the one or more services in the session; and transmit to a second network function a first request to report information related either to detected tethering events in the session or to detected tethering events for the one or more services in the session.

In some embodiments, the third network function 1200 may optionally comprise a communications interface 1202. The communications interface 1202 of the third network function 1200 can be for use in communicating with other nodes, such as other virtual nodes. For example, the communications interface 1202 of the third network function 1200 can be configured to transmit to and/or receive from other nodes requests, resources, information, data, signals, or similar. The processing circuitry 1201 of third network function 1200 may be configured to control the communications interface 1202 of the third network function 1200 to transmit to and/or receive from other nodes requests, resources, information, data, signals, or similar.

Optionally, the third network function 1200 may comprise a memory 1203. In some embodiments, the memory 1203 of the third network function 1200 can be configured to store program code that can be executed by the processing circuitry 1201 of the third network function 1200 to perform the method 300 described herein in relation to the third network function 1200. Alternatively, or in addition, the memory 1203 of the third network function 1200, can be configured to store any requests, resources, information, data, signals, or similar that are described herein. The processing circuitry 1201 of the third network function 1200 may be configured to control the memory 1203 of the third network function 1200 to store any requests, resources, information, data, signals, or similar that are described herein.

Figure 13:
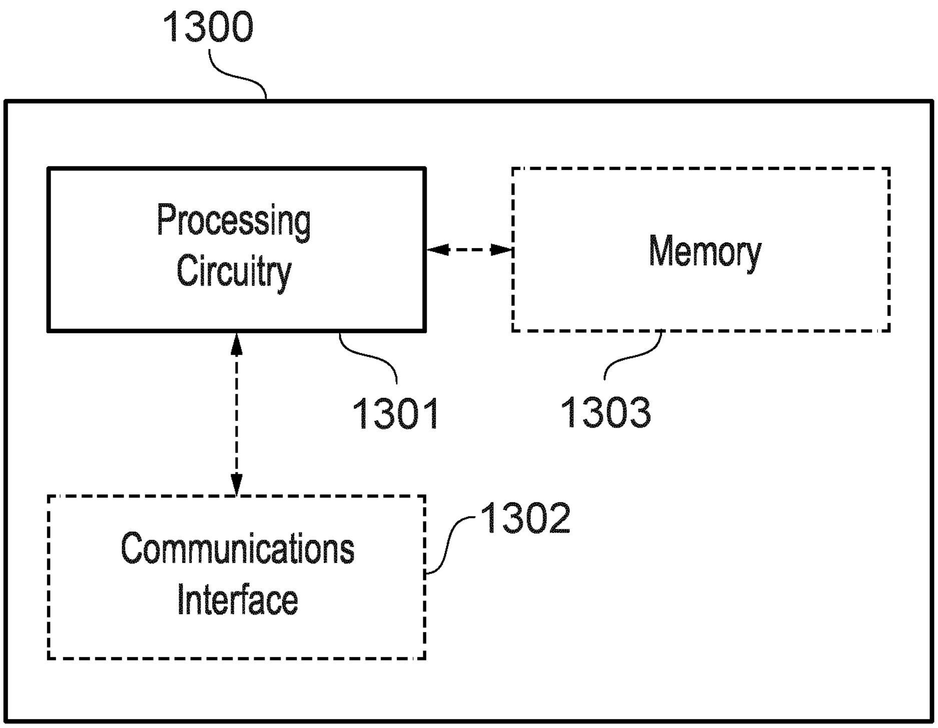
FIG. 13 illustrates a fourth network function comprising processing circuitry (or logic)

FIG. 13 illustrates a second network function 1300 comprising processing circuitry (or logic) 1301. The processing circuitry 1301 controls the operation of the second network function 1300 and can implement the method 400 described herein in relation to a second network function 1300. The processing circuitry 1301 can comprise one or more processors, processing units, multi-core processors or modules that are configured or programmed to control the second network function 1300 in the manner described herein. In particular implementations, the processing circuitry 1301 can comprise a plurality of software and/or hardware modules that are each configured to perform, or are for performing, individual or multiple steps of the method 400 described herein in relation to the second network function.

Briefly, the processing circuitry 1301 of the second network function 1300 is configured to: transmit, to a first network function, a first request to report information related to either detected tethering events in a session or detected tethering events for one or more services in the session; receive a first message from the first network function, the first message comprising tethering information related to either a first tethering event in the session at a first device or a first tethering event for one of the one or more services in the session at a first device.

In some embodiments, the second network function 1300 may optionally comprise a communications interface 1302. The communications interface 1302 of the second network function 1300 can be for use in communicating with other nodes, such as other virtual nodes. For example, the communications interface 1302 of the second network function 1300 can be configured to transmit to and/or receive from other nodes requests, resources, information, data, signals, or similar. The processing circuitry 1301 of second network function 1300 may be configured to control the communications interface 1302 of the second network function 1300 to transmit to and/or receive from other nodes requests, resources, information, data, signals, or similar.

Optionally, the second network function 1300 may comprise a memory 1303. In some embodiments, the memory 1303 of the second network function 1300 can be configured to store program code that can be executed by the processing circuitry 1301 of the second network function 1300 to perform the method 400 described herein in relation to the second network function 1300. Alternatively, or in addition, the memory 1303 of the second network function 1300, can be configured to store any requests, resources, information, data, signals, or similar that are described herein. The processing circuitry 1301 of the second network function 1300 may be configured to control the memory 1303 of the second network function 1300 to store any requests, resources, information, data, signals, or similar that are described herein.

Figure 14:
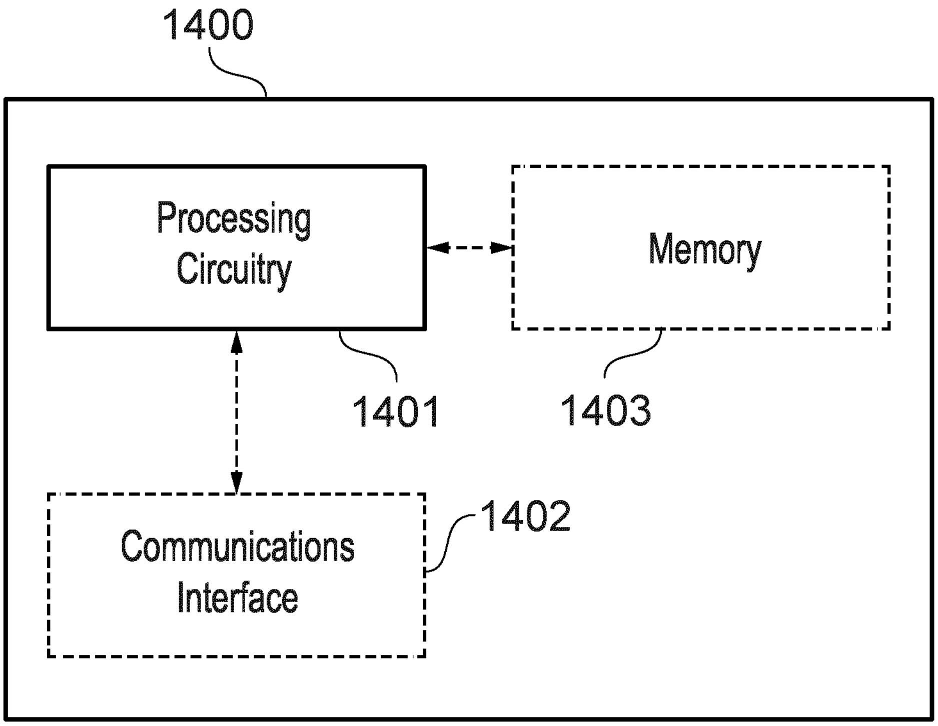
FIG. 14 illustrates another third network function comprising processing circuitry (or logic)

FIG. 14 illustrates a fourth network function 1400 comprising processing circuitry (or logic) 1401. The processing circuitry 1401 controls the operation of the fourth network function 1400 and can implement the method 500 described herein in relation to a fourth network function 1400. The processing circuitry 1401 can comprise one or more processors, processing units, multi-core processors or modules that are configured or programmed to control the fourth network function 1400 in the manner described herein. In particular implementations, the processing circuitry 1401 can comprise a plurality of software and/or hardware modules that are each configured to perform, or are for performing, individual or multiple steps of the method 500 described herein in relation to the fourth network function.

Briefly, the processing circuitry 1401 of the fourth network function 1400 is configured to: transmit, to a third network function, policy information relating at least in part to tethering events, wherein the policy information comprises one or more of: an identification of one or more services to which a first part of the policy information applies; an indication as to whether tethering is allowed for the session or allowed for the one or more services; a maximum number of devices allowed to tether for the session or allowed to tether for the one or more services; a list of device types allowed to tether for the session or allowed to tether for the one or more services.

In some embodiments, the fourth network function 1400 may optionally comprise a communications interface 1402. The communications interface 1402 of the fourth network function 1400 can be for use in communicating with other nodes, such as other virtual nodes. For example, the communications interface 1402 of the fourth network function 1400 can be configured to transmit to and/or receive from other nodes requests, resources, information, data, signals, or similar. The processing circuitry 1401 of fourth network function 1400 may be configured to control the communications interface 1402 of the fourth network function 1400 to transmit to and/or receive from other nodes requests, resources, information, data, signals, or similar.

Optionally, the fourth network function 1400 may comprise a memory 1403. In some embodiments, the memory 1403 of the fourth network function 1400 can be configured to store program code that can be executed by the processing circuitry 1401 of the fourth network function 1400 to perform the method 500 described herein in relation to the fourth network function 1400. Alternatively, or in addition, the memory 1403 of the fourth network function 1400, can be configured to store any requests, resources, information, data, signals, or similar that are described herein. The processing circuitry 1401 of the fourth network function 1400 may be configured to control the memory 1403 of the fourth network function 1400 to store any requests, resources, information, data, signals, or similar that are described herein.

Figure 15:
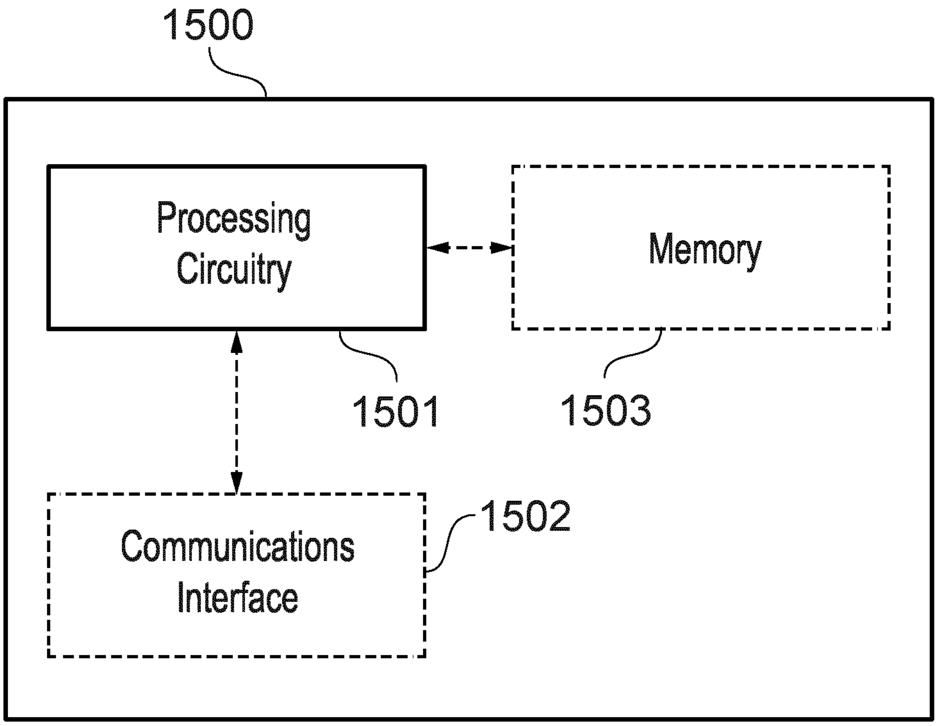
FIGS. 15 and 16 illustrates another first network function comprising processing circuitry (or logic).

FIG. 15 illustrates another third network function 1500 comprising processing circuitry (or logic) 1501. The processing circuitry 1501 controls the operation of the third network function 1500 and can implement the method 600 described herein in relation to a third network function 1500. The processing circuitry 1501 can comprise one or more processors, processing units, multi-core processors or modules that are configured or programmed to control the third network function 1500 in the manner described herein. In particular implementations, the processing circuitry 1501 can comprise a plurality of software and/or hardware modules that are each configured to perform, or are for performing, individual or multiple steps of the method 600 described herein in relation to the third network function.

Briefly, the processing circuitry 1501 of the third network function 1500 is configured to:

obtain first information for use in determining policies to be applied to traffic; determine, based on the first information, a first policy to be applied to traffic of a session; transmit, to a second network function, a rule comprising at least one tethering policy to be applied to tethering traffic, and at least one traffic policy to be applied to other non-tethering traffic, wherein the rule is determined based on the first policy.

In some embodiments, the third network function 1500 may optionally comprise a communications interface 1502. The communications interface 1502 of the third network function 1500 can be for use in communicating with other nodes, such as other virtual nodes. For example, the communications interface 1502 of the third network function 1500 can be configured to transmit to and/or receive from other nodes requests, resources, information, data, signals, or similar. The processing circuitry 1501 of third network function 1500 may be configured to control the communications interface 1502 of the third network function 1500 to transmit to and/or receive from other nodes requests, resources, information, data, signals, or similar.

Optionally, the third network function 1500 may comprise a memory 1503. In some embodiments, the memory 1503 of the third network function 1500 can be configured to store program code that can be executed by the processing circuitry 1501 of the third network function 1500 to perform the method 600 described herein in relation to the third network function 1500. Alternatively, or in addition, the memory 1503 of the third network function 1500, can be configured to store any requests, resources, information, data, signals, or similar that are described herein. The processing circuitry 1501 of the third network function 1500 may be configured to control the memory 1503 of the third network function 1500 to store any requests, resources, information, data, signals, or similar that are described herein.

Figure 16:
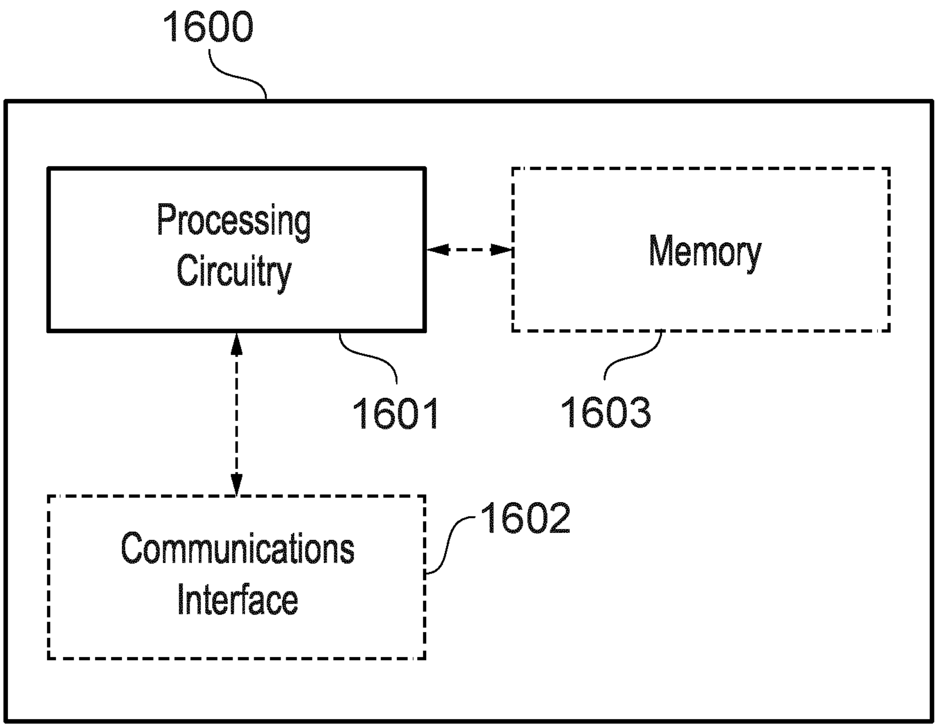

FIG. 16 illustrates another first network function 1600 comprising processing circuitry (or logic) 1601. The processing circuitry 1601 controls the operation of the first network function 1600 and can implement the method 700 described herein in relation to a first network function 1600. The processing circuitry 1601 can comprise one or more processors, processing units, multi-core processors or modules that are configured or programmed to control the first network function 1600 in the manner described herein. In particular implementations, the processing circuitry 1601 can comprise a plurality of software and/or hardware modules that are each configured to perform, or are for performing, individual or multiple steps of the method 700 described herein in relation to the first network function.

Briefly, the processing circuitry 1601 of the first network function 1600 is configured to: receive, from a second network function, a request to create or update a session based on a rule, wherein the rule comprises at least one tethering policy to be applied to tethering traffic, and at least one traffic policy to be applied to other non-tethering traffic, wherein each of the at least one tethering policy to be applied to the tethering traffic comprises one of more of: an identification of one or more devices to which the tethering policy is to be applied; an indication that the tethering policy is to be applied to all tethered traffic; a list of device types either allowed to tether for the session or allowed to tether for the one or more services in the session; a condition relating to a number of tethered devices, wherein the tethering policy is to be applied when the condition is fulfilled.

In some embodiments, the first network function 1600 may optionally comprise a communications interface 1602. The communications interface 1602 of the first network function 1600 can be for use in communicating with other nodes, such as other virtual nodes. For example, the communications interface 1602 of the first network function 1600 can be configured to transmit to and/or receive from other nodes requests, resources, information, data, signals, or similar. The processing circuitry 1601 of first network function 1600 may be configured to control the communications interface 1602 of the first network function 1600 to transmit to and/or receive from other nodes requests, resources, information, data, signals, or similar.

Optionally, the first network function 1600 may comprise a memory 1603. In some embodiments, the memory 1603 of the first network function 1600 can be configured to store program code that can be executed by the processing circuitry 1601 of the first network function 1600 to perform the method 700 described herein in relation to the first NF 1600. Alternatively, or in addition, the memory 1603 of the first network function 1600, can be configured to store any requests, resources, information, data, signals, or similar that are described herein. The processing circuitry 1601 of the first network function 1600 may be configured to control the memory 1603 of the first network function 1600 to store any requests, resources, information, data, signals, or similar that are described herein.

Figure 17:
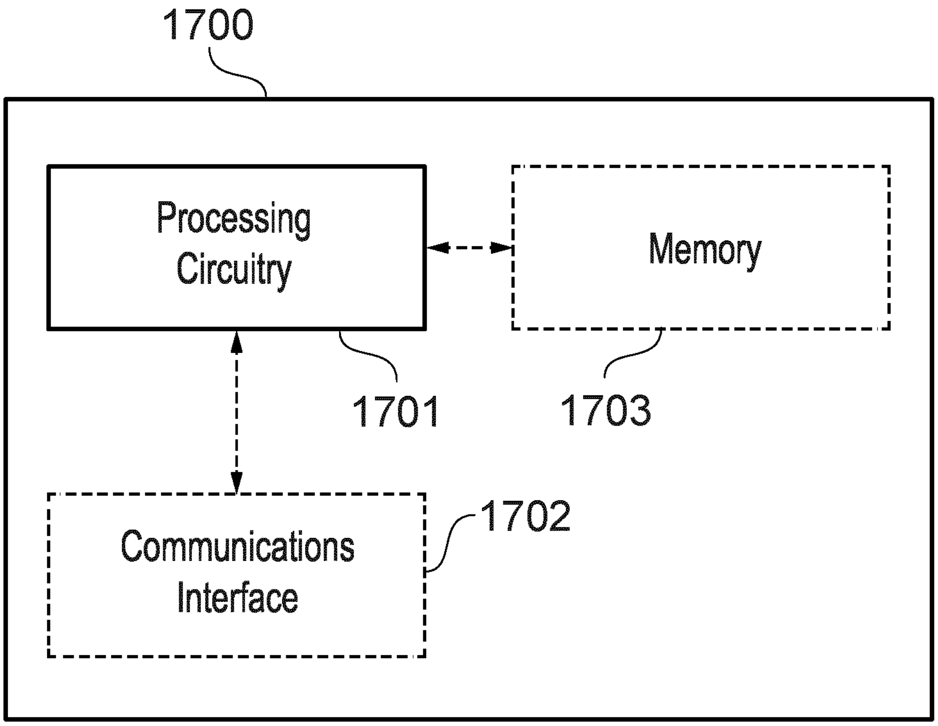

FIG. 17 illustrates another second network function 1700 comprising processing circuitry (or logic) 1701. The processing circuitry 1701 controls the operation of the second network function 1700 and can implement the method 700 described herein in relation to a second network function 1700. The processing circuitry 1701 can comprise one or more processors, processing units, multi-core processors or modules that are configured or programmed to control the second network function 1700 in the manner described herein. In particular implementations, the processing circuitry 1701 can comprise a plurality of software and/or hardware modules that are each configured to perform, or are for performing, individual or multiple steps of the method 700 described herein in relation to the second network function.

Briefly, the processing circuitry 1701 of the second network function 1700 is configured to: transmit to a first network function a request to create or update a session based on a rule, wherein the rule comprises at least one tethering policy to be applied to tethering traffic, and at least one traffic policy to be applied to other non-tethering traffic, wherein each of the at least one tethering policy to be applied to the tethering traffic comprises one of more of: an identification of one or more devices to which the tethering policy is to be applied; an indication that the tethering policy is to be applied to all tethered traffic; a list of device types either allowed to tether for the session or allowed to tether for the one or more services in the session; a condition relating to a number of tethered devices, wherein the tethering policy is to be applied when the condition is fulfilled.

In some embodiments, the second network function 1700 may optionally comprise a communications interface 1702. The communications interface 1702 of the second network function 1700 can be for use in communicating with other nodes, such as other virtual nodes. For example, the communications interface 1702 of the second network function 1700 can be configured to transmit to and/or receive from other nodes requests, resources, information, data, signals, or similar. The processing circuitry 1701 of second network function 1700 may be configured to control the communications interface 1702 of the second network function 1700 to transmit to and/or receive from other nodes requests, resources, information, data, signals, or similar.

Optionally, the second network function 1700 may comprise a memory 1703. In some embodiments, the memory 1703 of the second network function 1700 can be configured to store program code that can be executed by the processing circuitry 1701 of the second network function 1700 to perform the method 700 described herein in relation to the first NF 1700. Alternatively, or in addition, the memory 1703 of the second network function 1700, can be configured to store any requests, resources, information, data, signals, or similar that are described herein. The processing circuitry 1701 of the second network function 1700 may be configured to control the memory 1703 of the second network function 1700 to store any requests, resources, information, data, signals, or similar that are described herein.

There is also provided a computer program comprising instructions which, when executed by processing circuitry cause the processing circuitry to perform at least part of the method described herein. There is provided a computer program product, embodied on a non-transitory machine-readable medium, comprising instructions which are executable by processing circuitry to cause the processing circuitry to perform at least part of the method described herein. There is provided a computer program product comprising a carrier containing instructions for causing processing circuitry to perform at least part of the method described herein. In some embodiments, the carrier can be any one of an electronic signal, an optical signal, an electromagnetic signal, an electrical signal, a radio signal, a microwave signal, or a computer-readable storage medium.

Embodiments described herein allow the network operator to control tethering, by enabling the PCF to providing different policies for a service (or PDU session), depending on the number of devices and types of devices that are tethering behind a UE.

Embodiments described herein also enable the PCF to provide dynamically different policies for every different device tethering behind the UE and consuming the service (or for the PDU session), by enabling the PCF to make policy decisions based on not only the number of devices and types of devices that are tethering behind a UE, but additionally dynamic conditions such as the access type or RAT-type used by the UE.

This enables the operator to provide a flexible configuration that enables different enforcements to be applied and/or restricts the usage of tethering depending on a number of dynamic conditions, for a large number of different tethering scenarios. Additionally, the provided configuration is simplified as there is no need to define different appIds for the same service (separately for tethering traffic and non-tethering traffic), reducing the number of PCC rules that need to be installed by the PCF.

Embodiments described herein also reduce the signaling required to apply different policies for a service (or PDU session), depending on the number of devices and types of devices that are tethering behind a UE.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed at a first network function for obtaining information relating to tethering events, the method comprising:

receiving, from a second network function, a first request to report information either related to detected tethering events in a session or related to detected tethering events for one or more services in a session, wherein the second network function comprises a Session Management function (SMF);

detecting a first tethering event at a first device; and transmitting a first message to the second network function, the first message comprising tethering information, related to the first tethering event, wherein the tethering information comprises an identification of a device type of the first device.

2. The method according to claim 1, wherein the tethering information in the first message is based on the first request comprising a request to report one or more of:

a device identification of any device either performing tethering events in the session or performing tethering events for the one or more services in the session; and a device type of any device either performing tethering events in the session or performing tethering events for the one or more services in the session.

3. The method according to claim 1, wherein the first request comprises a request to establish or modify the session.

4. The method according to claim 3, wherein the request to establish or modify the session is based on a first rule, wherein the first rule is to be applied to traffic either in the session or for the one or more services in the session, and wherein the first rule is based at least in part on a first policy to be applied either to tethering traffic in the session or to tethering traffic for the one or more services in the session, wherein the first policy indicates that the second network function should report information relating either to detected tethering events in the session or to detected tethering events for the one or more services in the session.

5. The method as claimed in claim 4, wherein the first rule comprises a policy and charging control, PCC, rule or a session rule.

6. The method according to claim 1, wherein the tethering information comprises one or more of:

an indication that tethering has either been detected in the session or been detected for one of the one or more services in the session; and an identification of the first device.

7. The method according to claim 1, wherein the method further comprises:

receiving, from the second network function, a second request to modify the session based on a second rule based at least in part on the tethering information related to the first tethering event, wherein the second rule comprises at least one tethering policy to be applied to tethering traffic of the first tethering event, and at least one traffic policy to be applied to either other non-tethering traffic in the session or other non-tethering traffic for one or more services in the session.

8. The method according to claim 1, wherein the first network function comprises a User Plane function (UPF).

9. A method performed at a third network function for obtaining information relating to tethering events, the method comprising:

obtaining first information for use in determining policies to be applied to traffic;

determining, based on the first information, a first policy to be applied to either tethering traffic in a session or tethering traffic for one or more services in the session, wherein the first policy indicates that a second network function, should report information relating either to detected tethering events in the session or to detected tethering events for the one or more services in the session, wherein the second network function comprises a Session Management function (SMF);

transmitting to the second network function a first request to report information related either to detected tethering events in the session or to detected tethering events for the one or more services in the session; and receiving tethering information from the second network function related to a first tethering event at a first device, wherein the tethering information comprises an identification of a device type of the first device.

10. The method as claimed in claim 9, further comprising:

transmitting a first rule to a second network function, wherein the first rule is to be applied to either traffic of the session or traffic for one or more services in the session, and wherein the first rule is based at least in part on the first policy.

11. The method as claimed in claim 10, wherein the first rule comprises a policy and charging control, PCC, rule or a session rule.

12. The method as claimed in claim 10, further comprising transmitting the first rule and the first request as part of a first message, wherein the first message comprises a response to a request to create or update the session.

13. The method as claimed in claim 9, wherein the first request comprises a request to report one or more of: a device identification of any device performing tethering events either in the session or for the one or more services in the session; and a device type of any device performing tethering events either in the session or for the one or more services in the session.

14. The method according to claim 10, wherein the method further comprises:

determining a second policy based on the tethering information and the first information;

updating the first rule, based on the second policy, to form a second rule, wherein the second rule comprises at least one tethering policy to be applied to tethering traffic of the first tethering event, and at least one traffic policy to be applied to other non-tethering traffic in the session or other non-tethering traffic for the one or more services in the session, wherein the first tethering event is either in the session or for the one of the one or more services in the session; and transmitting the second rule to the second network function.

15. The method as claimed in claim 14, wherein at least part of the first information is received from a fourth network function.

16. The method as claimed in claim 15, wherein the at least part of the first information received from the fourth network function comprises one or more of:

an identification of the one or more services to which the at least part of the first information applies;

an indication as to whether tethering is allowed for the session or for the one or more services;

a maximum number of devices allowed to tether for the session or for the one or more services; and a list of device types allowed to tether for the session or for the one or more services.

17. The method according to claim 15, wherein:

the third network function comprises a Policy Control Function (PCF); and the fourth network function comprises a Unified Data Repository (UDR).

18. The method as claimed in claim 14, wherein the tethering information comprises one or more of:

an indication that tethering has been detected in the session or for the one of the one or more services in the session; and an identification of the first device.

19. The method as claimed in claim 14, wherein each of the at least one tethering policy to be applied to the tethering traffic comprises one of more of:

an identification of one or more devices to which the at least one tethering policy is to be applied;

an indication that the at least one tethering policy is to be applied to all tethered traffic;

a list of device types either allowed to tether for the session or allowed to tether for the one or more services in the session; and a condition relating to a number of tethered devices, wherein the at least one tethering policy is to be applied when the condition is fulfilled.

* * * * *